United States Patent
Koros et al.

(10) Patent No.: US 12,215,288 B2
(45) Date of Patent: Feb. 4, 2025

(54) MEMBRANES FOR CONTAMINANT REMOVAL FROM NATURAL GAS AND METHODS FOR USE THEREOF

(71) Applicants: CHEVRON U.S.A. INC., San Ramon, CA (US); GEORGIA TECH RESEARCH CORPORATION, Atlanta, GA (US)

(72) Inventors: William Koros, Atlanta, GA (US); Yang Liu, Atlanta, GA (US); Zhongyun Liu, Atlanta, GA (US); Nitesh Bhuwania, San Ramon, CA (US); Daniel Chinn, San Ramon, CA (US)

(73) Assignees: CHEVRON U.S.A. INC.; GEORGIA TECH RESEARCH CORPORATION

( * ) Notice: Subject to any disclaimer, the term of this patent is extended or adjusted under 35 U.S.C. 154(b) by 29 days.

(21) Appl. No.: 17/618,381

(22) PCT Filed: Jun. 9, 2020

(86) PCT No.: PCT/US2020/036795
§ 371 (c)(1),
(2) Date: Dec. 10, 2021

(87) PCT Pub. No.: WO2020/251937
PCT Pub. Date: Dec. 17, 2020

(65) Prior Publication Data
US 2022/0306955 A1    Sep. 29, 2022

Related U.S. Application Data

(60) Provisional application No. 62/860,102, filed on Jun. 11, 2019.

(51) Int. Cl.
*C10L 3/10*    (2006.01)
*B01D 53/22*    (2006.01)
(Continued)

(52) U.S. Cl.
CPC ............ *C10L 3/103* (2013.01); *B01D 53/228* (2013.01); *B01D 67/0093* (2013.01);
(Continued)

(58) Field of Classification Search
None
See application file for complete search history.

(56) References Cited

U.S. PATENT DOCUMENTS 5,407,467 A * 4/1995 Lokhandwala ...... B01D 53/228
                                                          95/52
5,690,870 A * 11/1997 Hachisuka ............ B01D 71/64
                                                         264/129
(Continued)

FOREIGN PATENT DOCUMENTS

WO    2019006045 A1    1/2019

OTHER PUBLICATIONS

Kraftschik, Brian et al., "Cross-Linkable Polyimide Membranes for Improved Plasticization Resistance and Permselectivity in Sour Gas Separations", Macromolecules, 2013, 64, pp. 6908-6921. (Year: 2013).*

(Continued)

*Primary Examiner* — Jason M Greene
(74) *Attorney, Agent, or Firm* — Hunton Andrews Kurth LLP

(57) ABSTRACT

Disclosed is a method for removing hydrogen sulfide from natural gas. The method includes passing a natural gas feed including methane and hydrogen sulfide ($H_2S$) through a membrane at normal operating conditions. The membrane is an asymmetric hollow fiber membrane or an asymmetric film composite membrane including a porous layer and a nonporous skin layer. The asymmetric hollow fiber membrane or the nonporous skin layer of the asymmetric film composite membrane plasticizes during the method by expo- (Continued)

sure to condensable gases with high critical temperature under the operating conditions. The membrane preferentially removes H2S over methane from the natural gas feed at a H2S/methane selectivity of from 7 to 40 when measured at 35° C. and 45 bar.

19 Claims, 19 Drawing Sheets

(51) Int. Cl.
    *B01D 67/00*     (2006.01)
    *B01D 69/02*     (2006.01)
    *B01D 69/08*     (2006.01)
    *B01D 71/64*     (2006.01)

(52) U.S. Cl.
    CPC ............ *B01D 69/02* (2013.01); *B01D 69/08* (2013.01); *B01D 71/64* (2013.01); *C10L 3/104* (2013.01); *B01D 2256/245* (2013.01); *B01D 2257/304* (2013.01); *B01D 2257/504* (2013.01); *B01D 2325/022* (2013.01); *B01D 2325/36* (2013.01); *C10L 2290/548* (2013.01)

(56) References Cited

U.S. PATENT DOCUMENTS

| | | | |
|---|---|---|---|
| 9,718,031 B2 | 8/2017 | Ma et al. | |
| 2003/0126990 A1* | 7/2003 | Koros | ................. B01D 53/228 96/10 |
| 2005/0069700 A1* | 3/2005 | Chung | .................. B01D 71/64 428/364 |
| 2012/0168154 A1* | 7/2012 | Chinn | .................... C10L 3/103 166/267 |
| 2015/0011815 A1 | 1/2015 | Ma et al. | |
| 2018/0333675 A1 | 11/2018 | Liu et al. | |

OTHER PUBLICATIONS

International Search Report and Written Opinion dated Sep. 2, 2020 issued for International Application No. PCT/US2020/036795.
Yi, Shouliang et al., "A High-performance hydroxyl-functionalized polymer of instrinsic microporosity for an environmentally attractive membrane-based approach to decontamination of sour natural gas" J. Mater. Chem. A, 2015, 3, 22794-22806.
Kraftschik, Brian et al., "Cross-Linkable Polyimide Membranes for Improved Plasticization resistance and permseletively in sour gas separations" Macromolecules 2013, 46, 6908-6921.
European extended European search report dated May 22, 2023 issued in EP20821925.3.
Kraftschik, Brian E. A Dissertation Present to the Academic Faculty, pp. 1-352, Dec. 2013, [From the Internet] https://smartech.gatech.edu/bitstream/handle/1853/52964/KRAFTSCHIK-DISSERTATION-2013.pdf.
Wind, John D. et al., Carbon Dioxide-Induced Plasticization of Polyimide Membranes: Pseudo-Equilibrium Relationships of Diffusion, Sorption, and Swelling, Macromolecules, 2023, 36, pp. 6433-6441.
Yi, Shouliang et al., Ultraselective glassy polymer membranes with unprecedented performance for energy-efficient sour gas separation, Sci. Adv. 2019; 5, pp. 1-11.
Wind, John D. et al., Relaxation Dynamics of CO2 Diffusion, Sorption, and Polymer Swelling for Plasticized Polyimide Membranes, Macromolecules 2003, 36, pp. 6442-6448.
Zhang, Moli et al., Approaches to Suppress Co2-Induced Plasticization of Polyimide Membranes in Gas Separation Applications, Processes 2019, 7, 15, pp. 1-31.
Wessling, M. et al., Accelerated Plasticization of Thin-film composite membranes used in gas separation, Separation and Purification Technology 24 (2001) pp. 223-233.
Wind, John D. et al., The Effects of Crosslinking Chemistry on CO2 Plasticization of Polyimide Gas Separation Membranes, Ind. Eng. Chem. Res. 2002, 41, pp. 6139-6148.
Kraftschik, Brian E. et al., Dense film Polyimide Membranes for Aggressive Sour Gas Feed Separations, Journal Of Membrane Science 428 (2013) pp. 608-619.

* cited by examiner

6FDA-DAM —

Figure 4.7 Ternary phase diagram of 6FDA-DAM (without LiNO₃). Open circle: compositions on the phase boundary; solid circle: spinning dope composition

MEMBRANES FOR CONTAMINANT REMOVAL FROM NATURAL GAS AND METHODS FOR USE THEREOF

CROSS-REFERENCE TO RELATED APPLICATIONS

The present invention claims priority from provisional application U.S. Ser. No. 62/860,102 filed on Jun. 11, 2019 which application is incorporated herein by reference.

FIELD

The present disclosure relates generally to the field of contaminant removal from natural gas feed streams using membranes. The disclosure further relates to the use of asymmetric hollow fiber membranes and asymmetric film composite membranes that include a porous layer and a nonporous skin layer.

BACKGROUND AND SUMMARY

Natural gas is a particularly attractive energy source, due to its low carbon footprint and increased availability in comparison with coal. Methane ($CH_4$) typically comprises 50%-90% of natural gas; however, undesirable impurities, such as $H_2O$, $CO_2$, $H_2S$, $N_2$, $C_2H_6$ etc. are also present in the raw gas. Upgrading produced gas before delivery to the pipeline is required, and carbon dioxide ($CO_2$) and hydrogen sulfide ($H_2S$) are priority contaminants to remove. It is well known to use gas separation membranes to remove $CO_2$ and $H_2S$ from natural gas feed streams. The membranes used are commonly made from a polymer such as polyimide or cellulose acetate. The membranes used can take the form of asymmetric hollow fiber membranes and asymmetric film composite membranes that include a porous layer and a nonporous skin layer. Such known membranes are limited in terms of performance demonstrated. For instance, $H_2S$/methane selectivity performance is a limitation of known membranes that can result in less than optimal overall gas treatment processes from an economic or performance perspective.

There exists a continuing need for membranes and methods providing improved acid gas removal.

In general, in one aspect, the disclosure relates to a method for removal of hydrogen sulfide from natural gas. The method includes passing a natural gas feed including methane and hydrogen sulfide ($H_2S$) through a membrane at normal operating conditions. The membrane is an asymmetric hollow fiber membrane or an asymmetric film composite membrane including a porous layer and a nonporous skin layer. The asymmetric hollow fiber membrane or the nonporous skin layer of the asymmetric film composite membrane plasticizes during the method by exposure to condensable gases with high critical temperature under the operating conditions. The membrane preferentially removes $H_2S$ over methane from the natural gas feed at a $H_2S$/methane selectivity of from 7 to 40 when measured at 35° C. and 45 bar.

In another aspect, the disclosure can generally relate to the membrane as described above.

BRIEF DESCRIPTION OF THE DRAWINGS

These and other objects, features and advantages of the present invention will become better understood with reference to the following description, appended claims and accompanying drawings. The drawings are not considered limiting of the scope of the appended claims. Reference numerals designate like or corresponding, but not necessarily identical, elements. The drawings illustrate only example embodiments. The elements and features shown in the drawings are not necessarily to scale, emphasis instead being placed upon clearly illustrating the principles of the example embodiments. Additionally, certain dimensions or positionings may be exaggerated to help visually convey such principles.

DETAILED DESCRIPTION

Figure 1A:
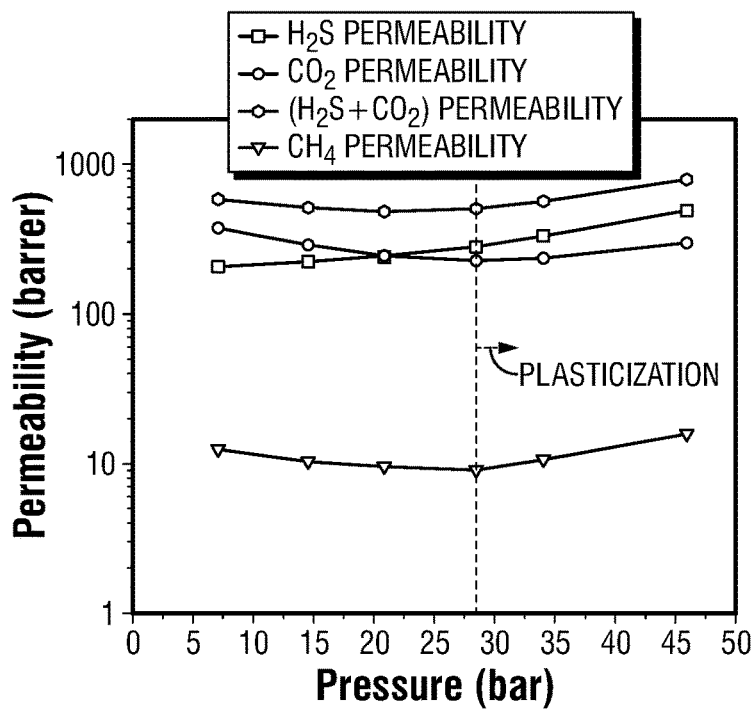
FIG. 1A shows the permeability of pre-aged 6FDA-DAM membrane (8 months) with H2S/CO2/CH4 composition of 20/20/60 up to 46 bar at 35° C.

In the context of membranes, plasticization is a swelling of the membrane structure caused by a penetrant within the polymer of the membrane. As defined herein, a membrane is plasticized when the CO2/methane selectivity of a sample of the membrane as determined at 35° C. and 45 bar is at least 33% lower than the CO2/methane selectivity of a separate sample of the membrane as determined at 35° C. and 7 bar. Plasticization is known to increase permeability of the membrane but decrease selectivity; thus plasticization is commonly viewed as a negative phenomenon for membranes including glassy polyimide membranes.

It has been found that a membrane for removal of hydrogen sulfide from natural gas containing methane and H2S that is prone to plasticization surprisingly has improved H2S/methane selectivity when the membrane is plasticized during use by condensable gases with high critical temperature under normal operating conditions. For example, the normal operating conditions can include a temperature of from 27° C. to 90° C. and/or a pressure of from 20 bar to 80 bar.

In one embodiment, the membrane preferentially removes H2S over methane from the natural gas feed at a H2S/methane selectivity of from 7 to 40 when measured at 35° C. and 45 bar.

In one embodiment, a natural gas feed including methane and $H_2S$ is passed through a membrane at normal operating conditions. The natural gas feed can also include carbon dioxide, C2H6, C3H8, toluene, mercaptans and combinations thereof. The partial pressure of CO2 in the natural gas feed can be from 1.4 bar to 20 bar. The partial pressure of H2S in the natural gas feed can be from 0.23 bar to 15 bar.

In one embodiment, the membrane is an asymmetric hollow fiber membrane.

In one embodiment, the membrane is an asymmetric film composite membrane including a porous layer and a nonporous skin layer. The underlying porous layer provides mechanical strength while the thin skin layer provides the separation properties. Both layers can be made of the same polymeric material.

In one embodiment, the membrane is formed of hydrophilic polyimide polymer or cellulose acetate polymer or cellulose triacetate polymer.

When the polymer is a hydrophilic polyimide polymer, side functional groups can be present as selected from alcohols, amines, carboxylic acids and combinations thereof. The hydrophilic polyimide polymer can have a backbone of (4,4'-hexafluoroisopropylidene) diphthalic anhydride-(2,4,6-trimethyl-1,3-diaminobenzene) ("6FDA-DAM"), and can further have 3,5-diaminebenzoic ("DABA") with a ratio of DAM to DABA of from 1:2 to 1:0.6. The backbone can have monoesterification groups selected from dietheylene glycol ("DEG"), triethylene glycol ("TEG") and tetraethylene glycol ("TetraEG").

When the polymer is hydrophilic polyimide polymer, the natural gas feed can be saturated with water.

The asymmetric hollow fiber membrane or the nonporous skin layer of the asymmetric film composite membrane plasticizes during the method by way of exposure to the condensable gases with high critical temperature present under the normal operating conditions. The condensable gases can include carbon CO2, H2S and combinations thereof.

The plasticized membrane preferentially removes H2S over methane from the natural gas feed at a H2S/methane selectivity of from 7 to 40 when measured at 35° C. and 45 bar. A system for removal of hydrogen sulfide from natural gas can include the plasticized membrane for receiving the natural gas feed comprising methane (CH4) and hydrogen sulfide (H2S), as well as other components known for use in a separation process.

In oil and gas reservoirs with H2S-rich gas, hydrocarbon production can often be constrained by bottlenecks in the amine or sulfur plant capacity of gas treatment facilities. H2S-removal membrane systems using the membranes disclosed herein have great potential to alleviate such bottlenecks and maximize hydrocarbon revenues.

Plasticization is surprisingly a powerful tool for performance optimization in natural gas upgrading. In one embodiment, plasticization of a 6FDA-DAM membrane provides benefits for H2S/CH4 separation, wherein both the H2S permeability and H2S/CH4 selectivity are increased compared to an equivalent, unplasticized membrane. Moreover, the CO2/CH4 separation performance of the membrane is somewhat preserved by engineering the extent of the plasticization as is described herein. Additionally, further tests using an aged membrane (8 months) show overall replicated membrane performance of fresh membrane with affordable permeability loss for both H2S and CO2 and increased H2S/CH4 and CO2/CH4 selectivity. The plasticization-engineered 6FDA-DAM membrane exhibit comparable H2S/CH4 separation performance but much higher CO2/CH4 separation performance than that of commercial rubbery polymer membranes. The example demonstrates that 6FDA-DAM membrane is a promising material for simultaneous H2S and CO2 removal from natural gas. Moreover, the principle and generality of "plasticization engineering" is illustrated by this example.

Figure 1B:
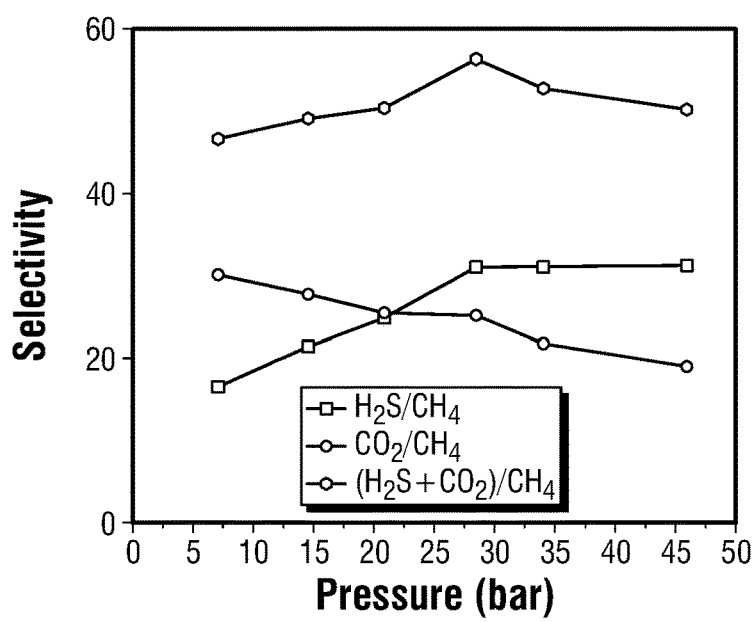
FIG. 1B shows the selectivity (H2S/CH4), (CO2/CH4), (H2S+CO2/CH4) of pre-aged 6FDA-DAM membrane (8 months) with H2S/CO2/CH4 composition of 20/20/60 up to 46 bar at 35° C.

This disclosure describes the benefits of controlled plasticization to enhance natural gas upgrading efficiency of 6FDA-DAM membrane. The principle illustrated is general and is disclosed as an important tool for optimizing membrane performance. Mixed gas tests under a H2S/CO2/CH4 ternary mixture with a composition of 20/20/60 (Case 1), respectively, show that both H2S permeability and H2S/CH4 selectivity increase with the increase of total feed pressure up to ~28 bar (FIG. 1A and FIG. 1B). Plasticization of the 6FDA-DAM polyimide is observed when the feed pressure is above ~30 bar, which introduces further increase of H2S permeability but, surprisingly, no drop of H2S/CH4 selectivity. This selectivity stability despite plasticization is opposite to traditional understanding that plasticization causes significant reduction of selectivity, as observed in CO2/CH4 and C3H6/C3H8 separations. This can be attributed to the high condensability of H2S that allows H2S molecules more competitive than CO2 and CH4 to occupy extra voids produced by plasticization. As a result, the 6FDA-DAM membrane shows a H2S/CH4 selectivity of ~31 at 46 bar, which is above that of commercial rubbery membranes.

Figure 1C:
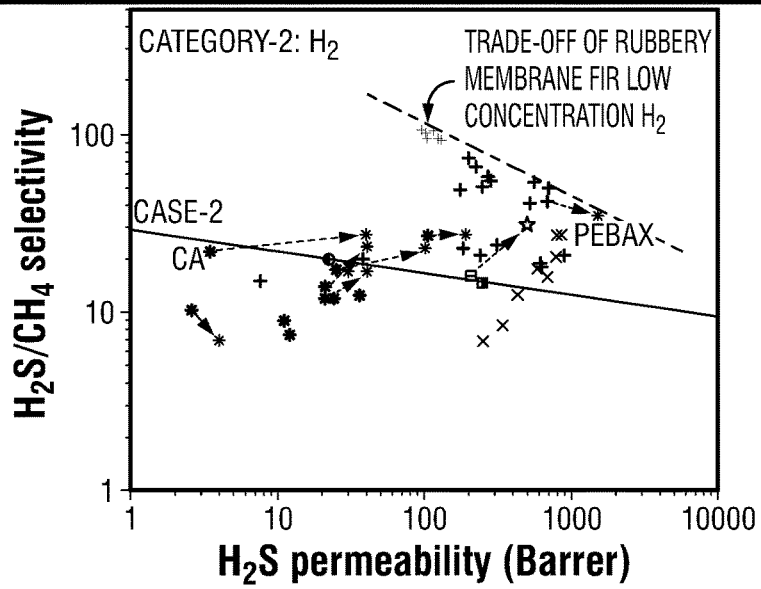
FIG. 1C shows the selectivity (H2S/CH4) versus permeability (H2S) of several membranes in the literature with those in the present work.

FIGS. 1A-1C show H2S/CH4, CO2/CH4 and (H2S+CO2)/CH4 separation performance of pre-aged 6FDA-DAM membrane (8 months) with H2S/CO2/CH4 composition of 20/20/60 up to 46 bar at 35° C. FIG. 1A shows permeability; FIG. 1B shows selectivity; and FIG. 1C is a comparison of H2S/CH4 separation performance. Moreover, effects of temperature and pressure are also considered in presenting the literature data. Results of 6FDA-DAM/DABA (3:2) membrane are shown for reference.

As compared with many other known polymer membranes, the 6FDA-DAM membrane shows an excellent balance between separation performance and stability. The stability of the 6FDA-DAM membrane was evaluated by simply storing a film in a sealed plastic sample bag for 8 months without any further treatment. Mixed gas tests at 6.9 bar show that the aged 6FDA-DAM membrane can generally replicate the membrane performance of fresh membrane with affordable permeability lost (16.0%) and increased selectivity (10.7%) (FIG. 1C). By contrast, a AO-PIM-1 membrane with higher performance showed a drastic reduction of both H2S permeability (95.8%) and H2S/CH4 selectivity (20%) after 6 months aging (FIG. 1C). This excellent stability of the 6FDA-DAM polyimide membrane is especially appealing, since it may suggest even more attractive performance in asymmetric membrane forms where selectivity can be used and productivity can be maintained if thin selective layers can be achieved. This is important, since 6FDA-DAM-based hollow fiber membranes may provide comparable H2S/CH4 selectivity but much higher H2S permeance in comparison the commercial rubbery polymer membranes. Moreover, in comparison with cellulose acetate (CA) and crosslinked polyimide membranes, e.g. 6FDA-DAM/DABA (3:2), TEGMC and DEGMC, the H2S/CH4 separation efficiency of the 6FDA-DAM membrane is much higher, since the plasticized 6FDA-DAM polyimide membrane provides more sites for H2S interaction. Moreover, by adjusting compositions of the basic 6FDA-DAM backbone using the above additional functional groups without crosslinking, optimizing plasticization enhanced performance can be achieved. For diverse feed conditions for specific natural gas mixtures with CO2 and H2S, the principle of plasticization engineering can be applicable.

The 6FDA-DAM membrane also provides reasonably high CO2/CH4 separation efficiency. The plasticized 6FDA-DAM membrane still shows higher CO2/CH4 separation performance far above all the rubbery polymer membranes reported for H2S/CO2/CH4 ternary mixture separation. This simultaneous H2S and CO2 capture ability of the 6FDA-DAM polyimide is important for natural gas upgrading since both acid gases must be removed before delivery of the treated gas.

Figure 2:
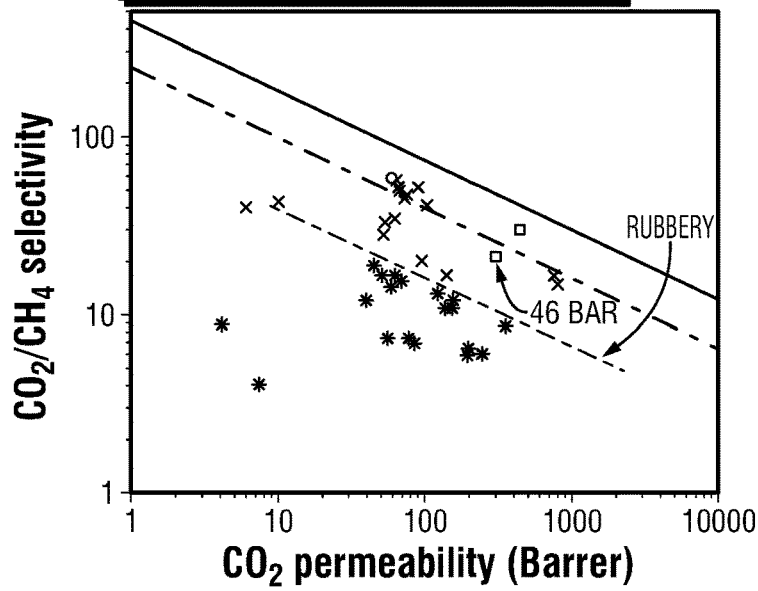
FIG. 2 is a comparison of CO2/CH4 separation performance between the glassy polyimide membranes and the rubbery polymer membranes

FIG. 2 is a comparison of CO2/CH4 separation performance between the glassy polyimide membranes and the rubbery polymer membranes. The "X" are glassy membranes from literature. The point of this figure is to show that the 6FDA-DAM and 6FDA-DAM-DABA are at the "1991 upper bound."

Advantageously, plasticization of glassy polyimides benefits H2S/CH4 separations. Glassy 6FDA-DAM membranes show comparable H2S/CH4 separation performance with rubbery polymer membranes in ternary H2S/CO2/CH4 mixtures. With the added benefit of higher CO2/CH4 selectivity, 6FDA-DAM membranes provide advantages in natural gas upgrading.

Hydrogen sulfide (H2S) and carbon dioxide (CO2) are acid gases that often must be removed from natural gas. Disclosed herein are the H2S/CH4 and CO2/CH4 separation performance of two polyimide membranes, i.e. 6FDA-DAM and 6FDA-DAM/DABA (3:2) for various realistic gas compositions and conditions. So-called plasticization effects of the polyimides are generally viewed as negative features when using such membranes, but reported are important applications with H2S present when plasticization actually is a tool for performance optimization. In fact, identified are cases where polyimide plasticization can provide large benefits for H2S/CH4 separations. Further disclosed is analysis of the transport mechanisms in terms of sorption and diffusion factors for various important feeds and conditions. The 6FDA-DAM membrane showed H2S permeability of 495 barrer and H2S/CH4 selectivity of ~31 with CO2 permeability of 301 barrer and CO2/CH4 selectivity of ~19 for a 20% H2S, 20% CO2 and 60% CH4 feed at 35° C. and 46 bar. Such CO2/CH4 performance and higher H2S/CH4 separation performance for aggressive high pressure feeds exceeds that of rubbery polymers, making the glassy materials surprisingly ideal for processing natural gas feeds containing H2S and CO2.

It should be noted that only the components relevant to the disclosure are shown in the figures, and that many other components normally part of a membrane system are not shown for simplicity.

For the purposes of this specification and appended claims, unless otherwise indicated, all numbers expressing quantities, percentages or proportions, and other numerical values used in the specification and claims are to be understood as being modified in all instances by the term "about." Accordingly, unless indicated to the contrary, the numerical parameters set forth in the following specification and attached claims are approximations that can vary depending upon the desired properties sought to be obtained by the present invention. It is noted that, as used in this specification and the appended claims, the singular forms "a," "an," and "the," include plural references unless expressly and unequivocally limited to one referent.

Unless otherwise specified, the recitation of a genus of elements, materials or other components, from which an individual component or mixture of components can be selected, is intended to include all possible sub-generic combinations of the listed components and mixtures thereof. Also, "comprise," "include" and its variants, are intended to be non-limiting, such that recitation of items in a list is not to the exclusion of other like items that may also be useful in the materials, compositions, methods and systems of this invention.

EXAMPLES

Preparation of Polyimide Membranes:

The polyimides shown below were dried in vacuum oven at 110° C. overnight before dissolution in THF to form 15 wt. % solutions, which were kept on a rolling mixer overnight. These solutions were cast on glass plates using a draw knife and placed in a glove bag pre-saturated with THF vapor for at least 4 h for slow evaporation to create 75 μm films. The films were left in the glove bag overnight to relieve casting stresses and finally dried in a vacuum oven at 200° C. for 24 hours to remove any remaining solvent.

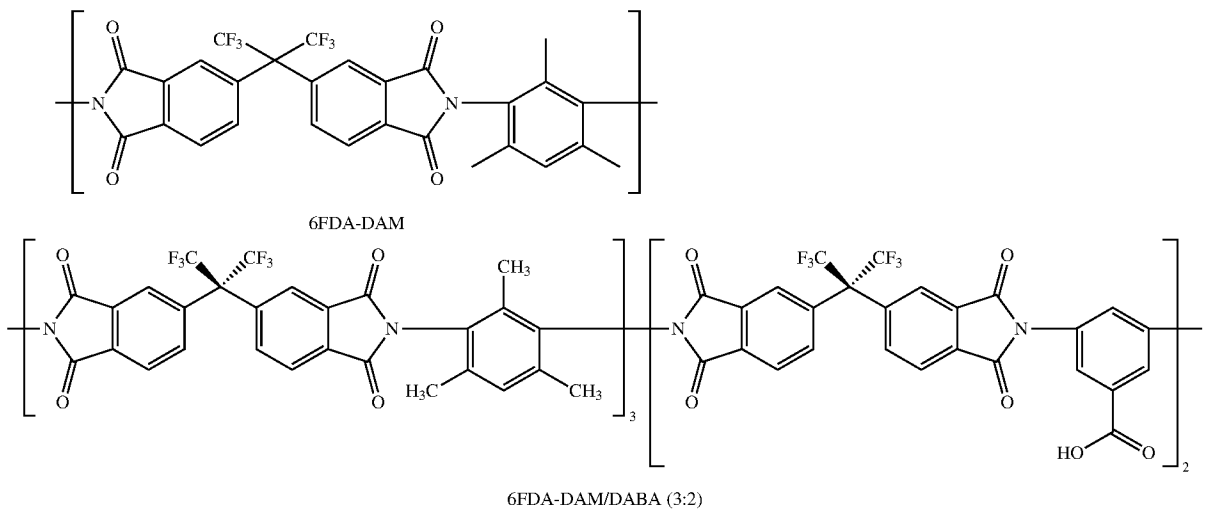

6FDA-DAM

6FDA-DAM/DABA (3:2)

Schematic representation of 6FDA-DAM and 6FDA-DAM/DABA (3:2) polyimides.

Pure Gas Sorption Tests:

Gas sorption isotherms were measured at 308 K up to 14 bar using a pressure decay method. Approximately 0.2-0.3 gram as-prepared samples (200° C. and 24 hours) were loaded into one cell (B) and degassed for overnight. Sorption gas was introduced into the reservoir cell (A) and the connecting valve was opened and closed, while recording the pressure in both volume (A) and volume (B) until equilibrium was achieved. The next step was then taken by adding another increment of gas. Detailed descriptions of the pressure decay method can be found elsewhere [24].

Gas Permeation Tests:

The gas permeation was conducted in a variable pressure, constant-volume apparatus described in prior studies [22]. The membrane was mounted between an upstream, capable of high-pressure gas introduction, and a downstream, kept under vacuum until experiments were initiated. Pure gas permeation tests were performed at 1.4 bar, 1.4 bar and 4.2 bar for H2S, CO2 and CH4, respectively and 308 K. Mixed gas permeation tests were performed using three H2S/CO2/CH4 gas mixtures in molar composition of 0.5/20/79.5 (Case-1), 5/45/50 (Case-2) and 20/20/60 (Case-3) at pressures up to 46 bar. The downstream composition was determined using a gas chromatograph (Varian 450-GC). The stage cut (the flow rate ratio of permeate to feed) was maintained below 1% to avoid concentration polarization on the upstream side of the permeation cell, keeping the driving force across the membrane constant throughout the course of the experiment. To ensure that all mixed gas data were collected at steady state, the membranes were pre-saturated under the target pressure for 1 to 6 hours, depending on the material and pressure used. The overall downstream pressure change with time ($d_p/d_t$) and the product gas composition were monitored continuously in the process, after which the final data were collected by averaging the stabilized data points, usually 2-3 points with negligible variation from each other. Finally, the vented exhaust H2S containing gas mixture were saturated with NaOH solution to avoid potential environmental and health issues.

Permeability, Solubility and Diffusivity:

Permeability and permselectivity were used to characterize membrane separation performance. The permeability, $P_i$, describes intrinsic gas separation productivity of a dense film membrane and is defined by the flux of penetrant i, $n_i$, normalized by the membrane thickness, l, and the partial pressure or fugacity difference, $\Delta f_i$, across the membrane, viz., $$P_i = \frac{n_i \cdot l}{\Delta f_i} \tag{1}$$

To estimate pure gas permeabilities, the slopes of permeate pressure vs. time (dp/dt); membrane thickness (l); downstream volume (V); operating temperature (T); and transmembrane pressure or fugacity difference ($\Delta f$) were used with Eq. 2:

$$P = \frac{\frac{dp}{dt} \cdot l \cdot V}{A \cdot T \cdot \Delta f} \tag{2}$$

The mixed gas permeability coefficient of component i ($P_i$) was calculated using its mole fraction in the permeate ($x_i$) and the transmembrane fugacity difference ($\Delta f_i$):

$$P_i = \frac{\frac{dp}{dt} \cdot x_i \cdot l \cdot V}{A \cdot T \cdot \Delta f_i} \tag{3}$$

As note in Eq (3), in the permeation calculation, fugacity (NIST software standard reference database) was used instead of partial pressure to account for the non-idealities of gases. The perm-selectivity, $\alpha_{ij}$, is determined by the ratio of the component i permeability to the component j permeability:

$$\alpha_{ij} = \frac{P_i}{P_j} \tag{4}$$

Permeability can also be expressed as the product of the average effective diffusion coefficient (D) and sorption coefficient ($\mathbb{S}$) of a given gas i within the membrane:

$$P_i = D_i \cdot \mathbb{S}_i \tag{5}$$

The sorption coefficient represents the thermodynamic contribution to transport, which can be measured independently by pressure-decay sorption. The sorption coefficient can be expressed as:

$$\mathbb{S}_i = \frac{c_i}{f_i} \tag{6}$$

where $c_i$ is the concentration of a gas adsorbed in the sample, and $f_i$ is the corresponding upstream fugacity driving force of component i. In this work, the adsorbed gas concentration in film was described by the dual-mode sorption model, which is given as:

$$c_i = c_{D,i} + c_{H,i} = k_{D,i} \cdot f_i + \frac{C'_{H,i} \cdot b_i \cdot f_i}{1 + b_i \cdot f_i} \tag{7}$$

where $C_{D,i}$ is the Henry's law or dissolved mode penetrant concentration, $C_{H,i}$ is the penetrant concentration in the Langmuir mode or hole-filling sorption mode. The $k_{D,i}$ is the Henry's law sorption coefficient reflecting properties of polymer matrix. On the other hand, $C'_{H,i}$ is the Langmuir capacity constant, and $b_i$ is the Langmuir affinity constant.

The effective diffusion coefficient (D) in the membrane was calculated from the independently measured permeability (P) and sorption coefficient (s):

$$D_i = \frac{P_i}{\mathbb{S}_i} \tag{8}$$

Figure 3A:
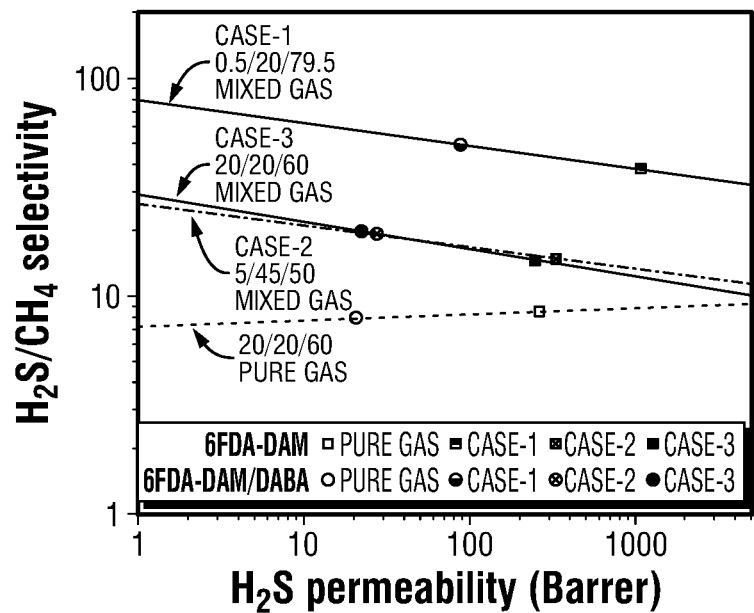
FIG. 3(a) shows H2S/CH4 separation performance of 6FDA-DAM and 6FDA-DAM/DABA membranes for H2S/CO2/CH4 ternary gas compositions at 308 K and 7 bar.

Results and Discussion:

FIG. 3 shows the $H_2S/CH_4$ and $CO_2/CH_4$ separation efficiency of the 6FDA-DAM and 6FDA-DAM/DABA membranes under various gas compositions in ternary gas mixtures at 308 K and 6.9 bar. The ternary gas mixtures $H_2S$, $CO_2$ and $CH_4$ compositions clearly affect membrane performance, especially $H_2S/CH_4$ separation efficiency. A strong increase in both $H_2S$ permeability (3.3 fold) and $H_2S/CH_4$ selectivity (1.6 fold) occurs when $H_2S$ mole percent is lowered from 20% (Case-3) to 0.5% (Case-1) for 6FDA-DAM in FIG. 2a. Specifically, the 6FDA-DAM membrane show a $H_2S$ permeability as high as 1087 barrer, with a $H_2S/CH_4$ selectivity of 38.6 in Case-1. This remarkable performance is far above the $H_2S/CH_4$ selectivity (20-30) of commercial polymer membranes [1]. Moreover, the $H_2S/CH_4$ selectivity increases further to 49.1 for the 6FDA-DAM/DABA polyimide; however, $H_2S$ permeability decreases to 87.4 barrer. Nevertheless, both 6FDA-based polyimides offer attractive tradeoff options to balance $H_2S$ permeability (1087 barrer→87.4 barrer) and $H_2S/CH_4$ selectivity (38.6→49.1) for this lower $H_2S$ concentration, which corresponds to many important gas feeds [1].

FIG. 3. (a) $H_2S/CH_4$ and (b) $CO_2/CH_4$ separation performance of 6FDA-DAM and 6FDA-DAM/DABA membranes for $H_2S/CO_2/CH_4$ ternary gas compositions at 308 K and 7 bar. Pure gas data were obtained from the pure gas condition in Case-3 (20/20/60) at 308 K with partial pressure of 1.4 bar, 1.4 bar and 4.2 bar for $H_2S$, $CO_2$ and $CH_4$, respectively.

Although $H_2S/CH_4$ separation performances in Case-2 and Case-3 are lower than for Case 1, the $H_2S/CH_4$ selectivities are still 20 and 14 for the 6FDA-DAM/DABA and 6FDA-DAM membranes, respectively. Pure gas results under the same $H_2S/CO_2/CH_4$ individual fugacities in Case-3 are compared with corresponding mixed gas results shown in FIG. 2a and are enlightening. Specifically, the $H_2S/CH_4$ selectivity is significantly enhanced in mixed gas conditions for both membranes relative to pure gas conditions, which is unusual for polymer membranes. The mixed gas results reflect rigorous attention to assuring true steady state was achieved with permeation experiments extended over 6 time lags to ensure stability of the permeation results. These results indicate that $H_2S$ molecules outcompete $CH_4$ molecules in the permeation process within the polyimide membranes, and will be discussed further in the following Section.

Figure 3B:
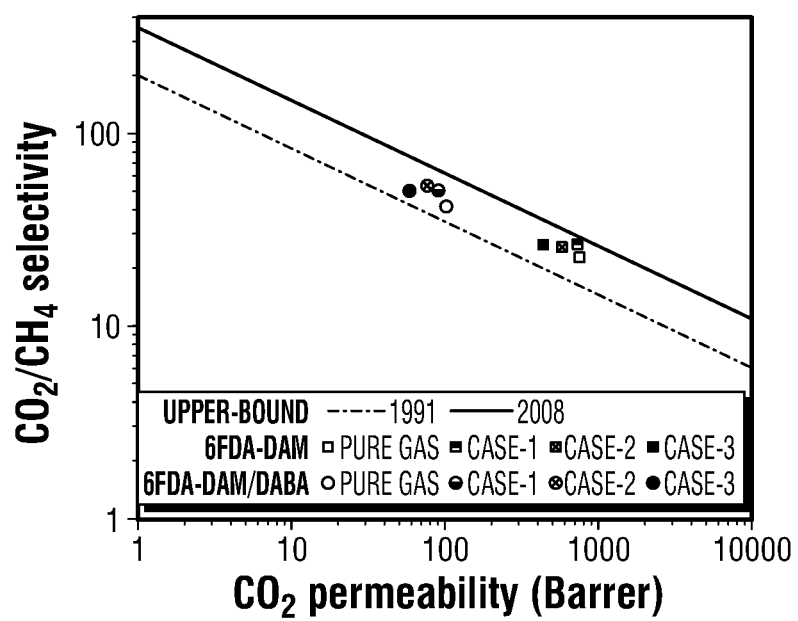
FIG. 3(b) shows CO2/CH4 separation performance of 6FDA-DAM and 6FDA-DAM/DABA membranes for H2S/CO2/CH4 ternary gas compositions at 308 K and 7 bar.

As shown in FIG. 3b, $CO_2/CH_4$ selectivity increases and CO2 permeability decreases as the $H_2S$ composition increases from pure gas to mixed gas. This fact notwithstanding, all $CO_2/CH_4$ cases are generally parallel to the idealized pure component 2008 upper bound line polymer membranes [20]. Clearly, the intrinsic $CO_2/CH_4$ separation efficiencies of both polyimides are well preserved in the presence of $H_2S$ under all current conditions, indicating impressive ability to simultaneously separate $H_2S$ and $CO_2$ from $CH_4$.

The 6FDA-DAM was further evaluated membrane using a film stored simply in a sealed plastic sample bag for 8 months without any further treatment, since other high free volume polymer show aging [25]. Mixed gas tests in Case-3 show that the aged 6FDA-DAM membrane can generally replicate the membrane performance of fresh membrane with affordable permeability lost for both $H_2S$ (246.5→206.9 barrer) and $CO_2$ (435.9→375.2 barrer) and increased $H_2S/CH_4$ (15.0→16.6) and $CO_2/CH_4$ (26.5→30.0) selectivity. These results are especially appealing, since they may suggest even more attractive performance in asymmetric membrane forms where selectivity can be used and productivity can be maintained if thin selective layers can be achieved. This time consuming work is underway, and will be reported later.

Figure 4A:
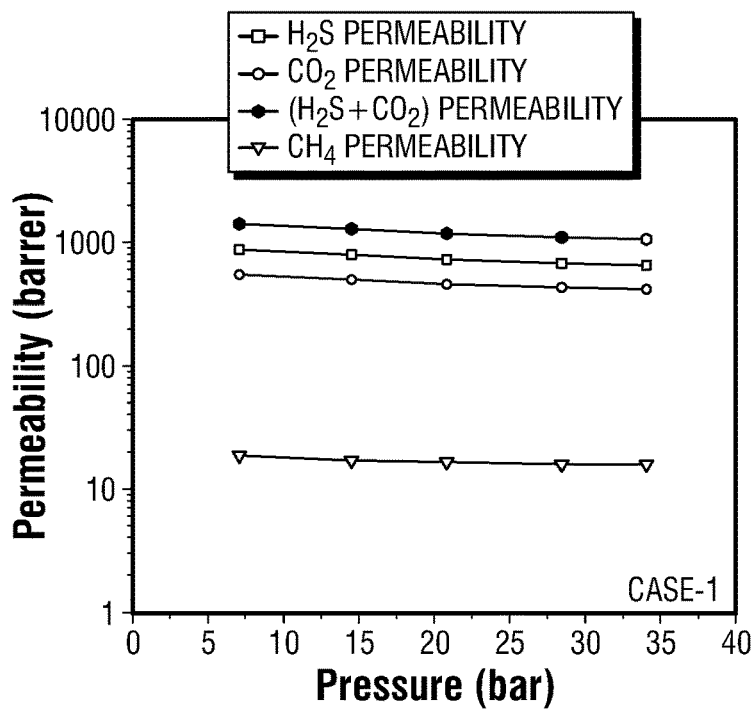
FIG. 4 shows H2S/CH4, CO2/CH4 and (H2S+CO2)/CH4 separation performance of pre-aged 6FDA-DAM membrane (8 months) in (a) Case-1 up to 35 bar and (b) Case-3 up to 46 bar at 308 K.
Figure 4B:
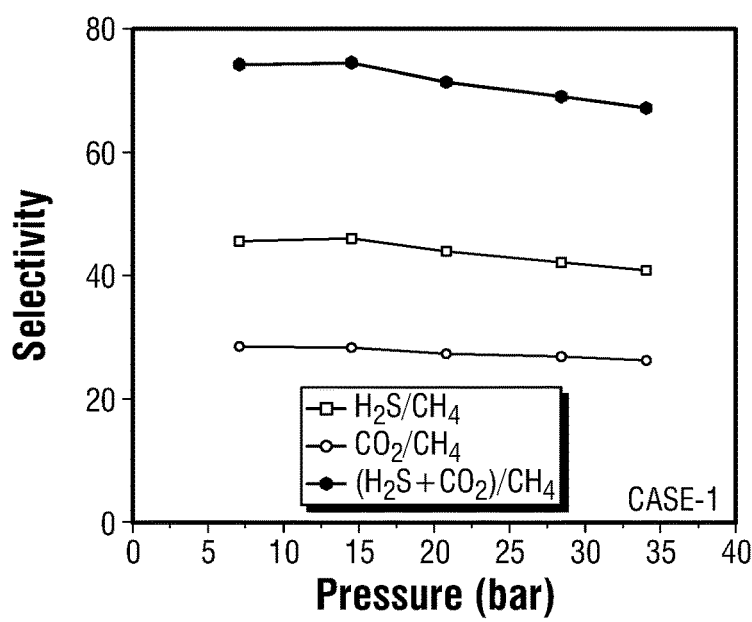
Figure 4C:
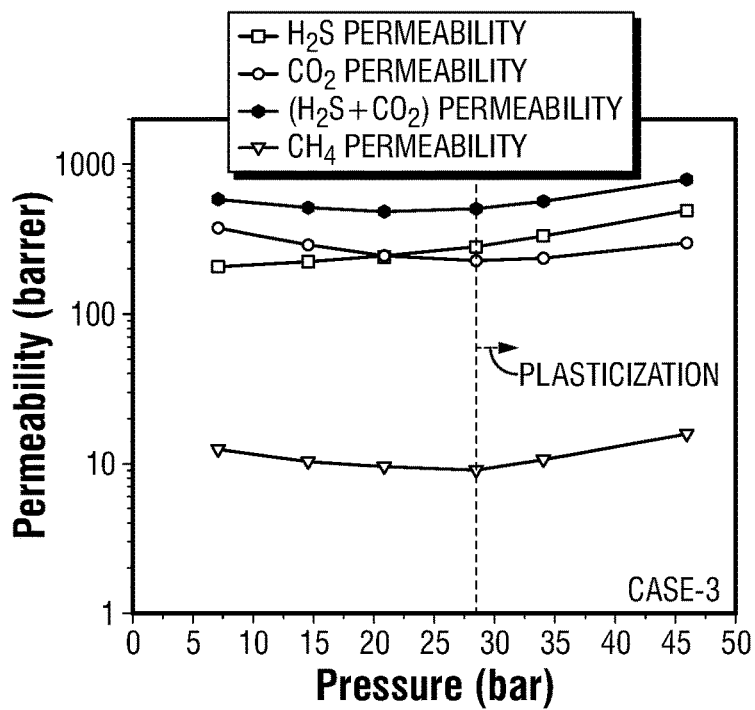
Figure 4D:
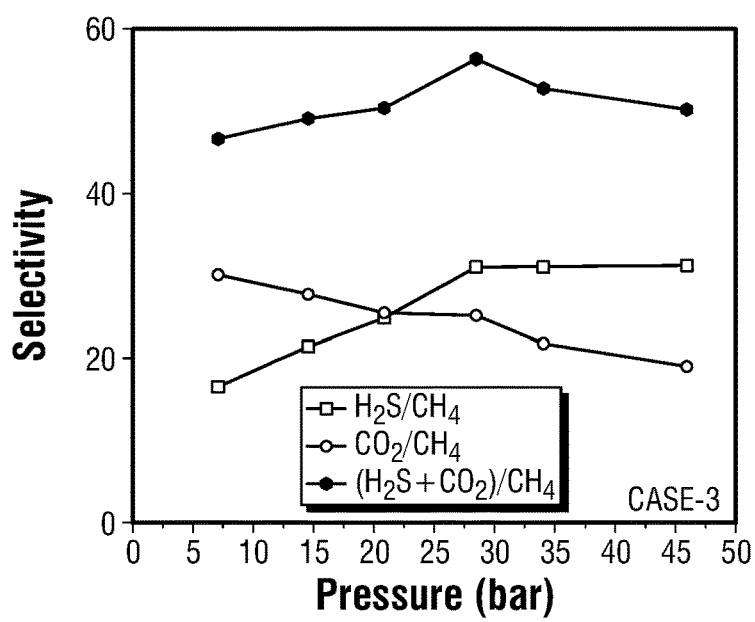

Aspects of plasticization effect of the pre-aged 6FDA-DAM membrane in Case-1 and Case-3 were further investigated by studying performance under high pressures up to 35 bar and 46 bar, respectively. High pressure results for 6FDA-DAM/DABA membrane in Case-3 can be found in previous studies [12, 16]. For Case-1 $H_2S/CH_4$ and $CO_2/CH_4$ separation efficiency is clearly maintained for a total pressure up to 35 bar (FIGS. 4a and 4b), and again, care was used to ensure true steady stated had been achieved. In contrast, plasticization is observed for Case-3 at a total pressure over ~28 bar as evidenced by the continuous increase of $CH_4$ permeability (FIG. 4c), but attractive performance is maintained, and two noteworthy phenomena occur before and after the plasticization of the polyimide. First, $H_2S$ permeability and $H_2S/CH_4$ selectivity increase systematically beyond that before plasticization in Case-3 (FIGS. 4c and 4d), a phenomenon that is absent in Case-1. This systematic increase provides improved separation efficiency of the aged 6FDA-DAM membrane in Case-3 at ~30 bar with a $H_2S/CH_4$ selectivity >30 and a $H_2S$ permeability over 300 barrer. More importantly, there is further increase of the $H_2S$ permeability (495 barrer at 46 bar) with no drop of the $H_2S/CH_4$ selectivity (~31 at 46 bar) after plasticization of the 6FDA-DAM membrane. If such an effect can be observed in an asymmetric membrane, it will be extraordinary, and as noted above, such a study is underway. Clearly, the $H_2S/CH_4$ trend in FIG. 4d is contrary to traditional plasticization effects wherein gas selectivity typically decreases with the increase of gas permeability, as observed in $CO_2/CH_4$ and $C_3H_6/C_3H_8$ separations [26, 27]. Indeed, a sharp decrease of the $CO_2/CH_4$ selectivity is observed in Case-3 after the plasticization of the 6FDA-DAM. While not wishing to be bound by any particular theory the opposing effect of plasticization on $CO_2/CH_4$ and $H_2S/CH_4$ separation may be understood in terms of different dominant mechanisms for these two gas pairs, as is discussed in the following Section. In any case, plasticization of polyimides, traditionally considered to be a disadvantage for gas separation, is a clear advantage for $H_2S/CH_4$ separation by offering higher $H_2S$ permeability and attractive $H_2S/CH_4$ selectivity.

FIG. 4. $H_2S/CH_4$, $CO_2/CH_4$ and $(H_2S+CO_2)/CH_4$ separation performance of pre-aged 6FDA-DAM membrane (8 months) in (a) Case-1 up to 35 bar and (b) Case-3 up to 46 bar at 308 K.

Figure 5A:
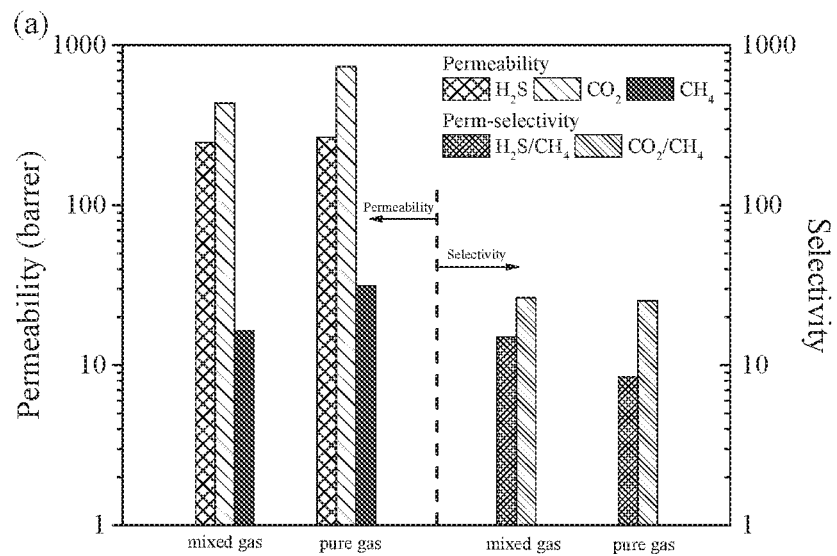
FIG. 5 shows Comparison of gas permeability and permselectivity between ternary mixed gas tests and pure gas tests for (a) 6FDA-DAM and (b) 6FDA-DAM/DABA (3:2). The gas composition of both pure gas and mixed gas are 20/20/60 with a total pressure of 7 bar at 35° C.
Figure 5B:
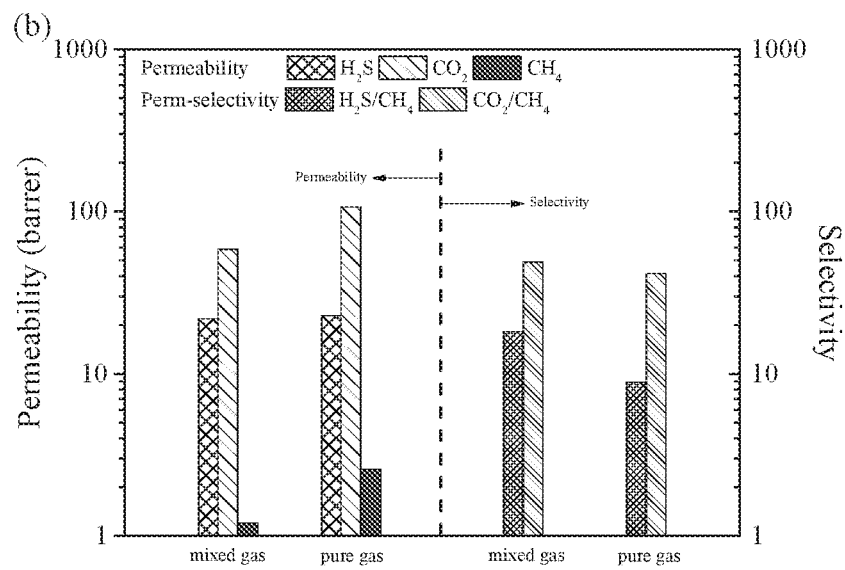

A Fundamental understanding of results in FIG. 3 and FIG. 4 is provided. As a first step, $H_2S$, $CO_2$ and $CH_4$ permeability and $H_2S/CH_4$ and $CO_2/CH_4$ selectivity results in Case-3 are compared with results from pure gas tests under conditions with equivalent individual penetrant feed fugacities, as shown in FIG. 5. In comparison with the pure gas data, $H_2S$, $CO_2$ and $CH_4$ permeabilities in the ternary mixed gas decrease differently by approximately 10%, 40% and 50%, respectively, for the 6FDA-DAM membrane at 6.9 bar total feed pressure in the mixture (FIG. 5a). At the same time, the $H_2S/CH_4$ and $CO_2/CH_4$ perm-selectivity are higher in the ternary mixture (FIG. 5a), and the 6FDA-DAM/DABA membrane shows a similar trend (FIG. 5b). The tendency clearly suggests $CH_4$ permeation is inhibited by $H_2S$ and $CO_2$ during the ternary gas permeation process in the 6FDA-based polyimide membranes, rather than being promoted as is expected due to simple plasticization.

FIG. 5. Comparison of gas permeability and perm-selectivity between ternary mixed gas tests and pure gas tests for (a) 6FDA-DAM and (b) 6FDA-DAM/DABA (3:2). The gas composition of both pure gas and mixed gas are 20/20/60 with a total pressure of 7 bar at 35° C.

Figure 6A:
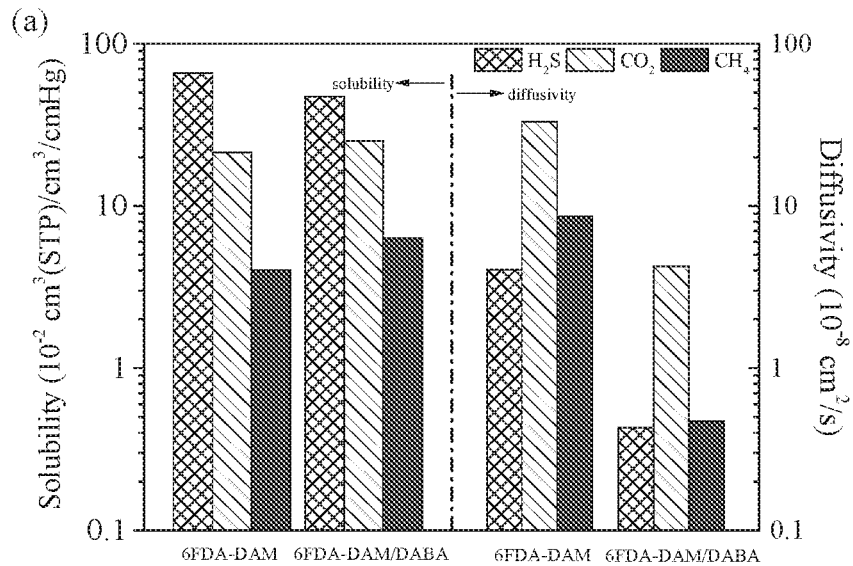
FIG. 6 shows (a) Solubility and diffusivity, and (b) sorption selectivity and diffusion selectivity of 6FDA-DAM and 6FDA-DAM/DABA calculated from pure gas permeation and sorption results. The partial pressure of H2S, CO2 and CH4 are 1.4 bar, 1.4 bar and 4.2 bar, respectively, representing a molar ratio of 20/20/60 that same as Case-3.
Figure 6B:
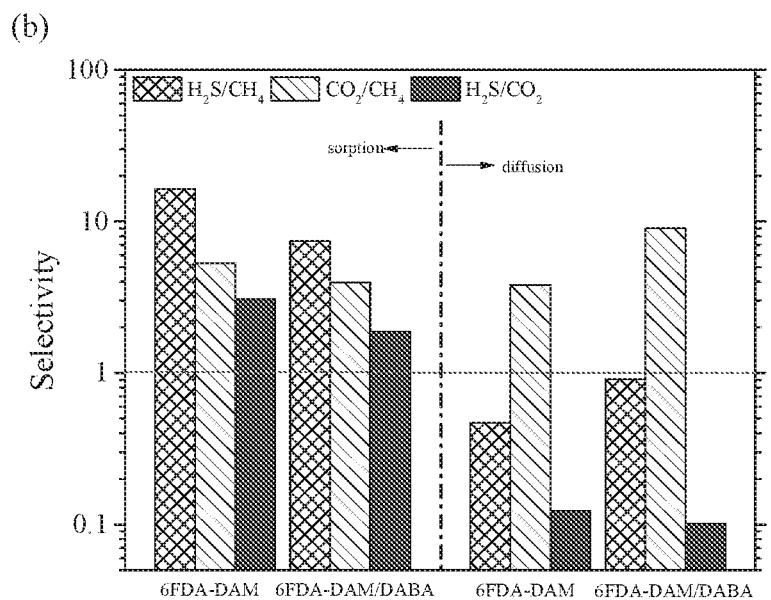

The pure gas permeability in terms of solubility and diffusivity contributions was deconvoluted based on the solution-diffusion theory to observe the sorption-selectivity and diffusion-selectivity factors in FIG. 6. Measurement details are summarized in Experimental Methods, and sorption isotherms are available in the Supporting Information. FIG. 6b shows the $H_2S/CH_4$ perm-selectivities of both membranes rely on the sorption-selectivity while suffering negative contributions from the diffusion-selectivity (<1). Apparently, both polyimides suffer expected diffusion selectivity loss, despite the slightly smaller kinetic diameter of $H_2S$ (3.6 Å) vs. $CH_4$ (3.8 Å). While not wishing to be bound by any particular theory it is possible that stronger sorption attractions between $H_2S$ vs. $CH_4$ with the polymer segments must be overcome to execute a jump, thereby reducing diffusion jump ease for $H_2S$, despite its smaller size. In this context, in a mixture, $H_2S$ can outcompete $CH_4$ for glassy sorption sites in terms of the dual mode model [12]. Despite this advantage, $H_2S$ pays a price for its higher affinity in terms of a higher activation energy and hence lower diffusion coefficient than might be expected based on size alone.

FIG. 6. (a) Solubility and diffusivity, and (b) sorption selectivity and diffusion selectivity of 6FDA-DAM and 6FDA-DAM/DABA calculated from pure gas permeation and sorption results. The partial pressure of $H_2S$, $CO_2$ and $CH_4$ are 1.4 bar, 1.4 bar and 4.2 bar, respectively, representing a molar ratio of 20/20/60 that same as Case-3.

On the other hand, both sorption-selectivity and diffusion-selectivity factors promote the $CO_2/CH_4$ perm-selectivity due to higher condensability and smaller molecular size of $CO_2$ vs. $CH_4$, since $CO_2$ has a weaker affinity (Supplemental Table S1) and more compact size vs. $H_2S$. This analysis is consistent with the reduction of $CH_4$ permeability and increase of $H_2S/CH_4$ and $CO_2/CH_4$ selectivity in ternary mixtures compared to pure gas results in FIG. 5. Simply put, $CH_4$ molecules are beaten by both $H_2S$ molecules and $CO_2$ molecules during mixture permeation. Specifically, FIG. 6a shows that $CO_2$ diffuse faster than $H_2S$, whereas $H_2S$ sorbs stronger than $CO_2$ in the two polyimides. This complex effect involving $CO_2$ and $H_2S$ makes ternary permeation a fascinating competition process and calls into questions simple tradeoff relations that are convenient for binary feeds. This issue can be appreciated further by considering the trade-off relationship of $CO_2$ permeability and $CO_2/H_2S$ selectivity (FIG. 7), which is clearly "complex". Specifically, pure gas tests predict $CO_2/H_2S$ separation performance of the two polyimides well above actual results due to the combination of effects noted above.

Figure 7:
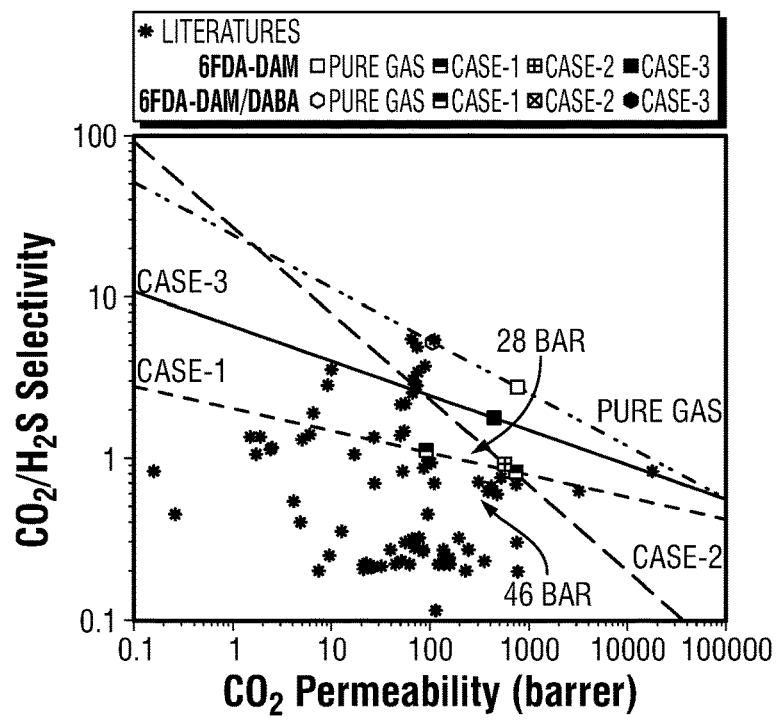
FIG. 7 shows Trade-off relationship of CO2/H2S for 6FDA-DAM and 6FDA-DAM/DABA membranes at various conditions. Pure gas tests were performed with same gas composition as in Case-3. All data are obtained under a total pressure of 7 bar unless notified.

FIG. 7. Trade-off relationship of $CO_2/H_2S$ for 6FDA-DAM and 6FDA-DAM/DABA membranes at various conditions. Pure gas tests were performed with same gas composition as in Case-3. All data are obtained under a total pressure of 7 bar unless notified.

In this regard, plasticization of polyimides, e.g. 6FDA-DAM, is no longer a drawback for the $H_2S/CH_4$ separation but only for the $CO_2/CH_4$ separation. Indeed, the plasticization of the 6FDA-DAM membrane causes a loss of the efficiency of the molecular sieving effect, which subsequently decreases the $CO_2/CH_4$ selectivity relying strongly on the diffusion-selectivity (FIG. 4b). However, the $H_2S/CH_4$ selectivity is dominated by the sorption factor, therefore the lost efficiency of the molecular sieving effect has negligible effect on further declining the $H_2S/CH_4$ diffusion selectivity, which is already <1 before plasticization. In contrast, the plasticization creates new free volume in the polyimide available for gas molecules to occupy, while $H_2S$ molecules are obviously more sorption-competitive than $CO_2$ and $CH_4$ molecules in such a process. This fact introduces a further decrease of the $CO_2/H_2S$ perm-selectivity (FIG. 7) and a well-maintained $H_2S/CH_4$ selectivity (FIG. 4b) at 46 bar.

Comparison of Rubbery and Glassy Polymer Membranes

Figure 9:
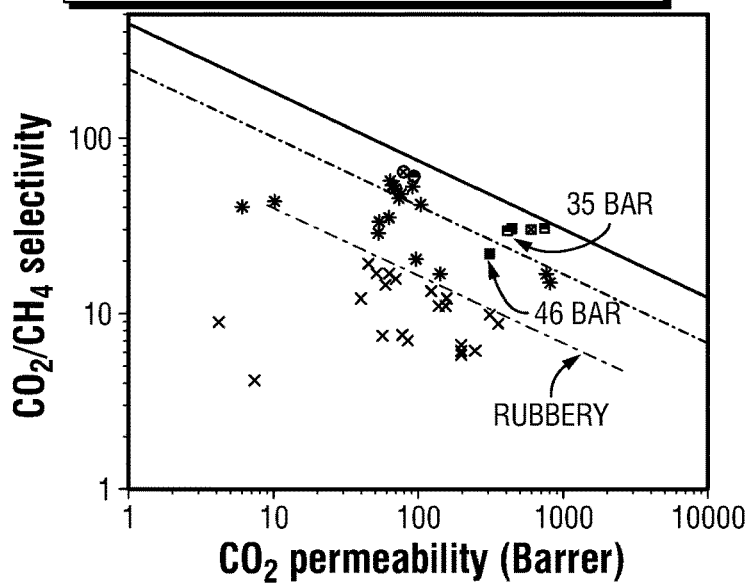
FIG. 9 shows Comparison of CO2/CH4 separation performance between the glassy polyimide membranes and the rubbery polymer membranes. All data are obtained from H2S/CO2/CH4 ternary mixtures
Figure 10A:
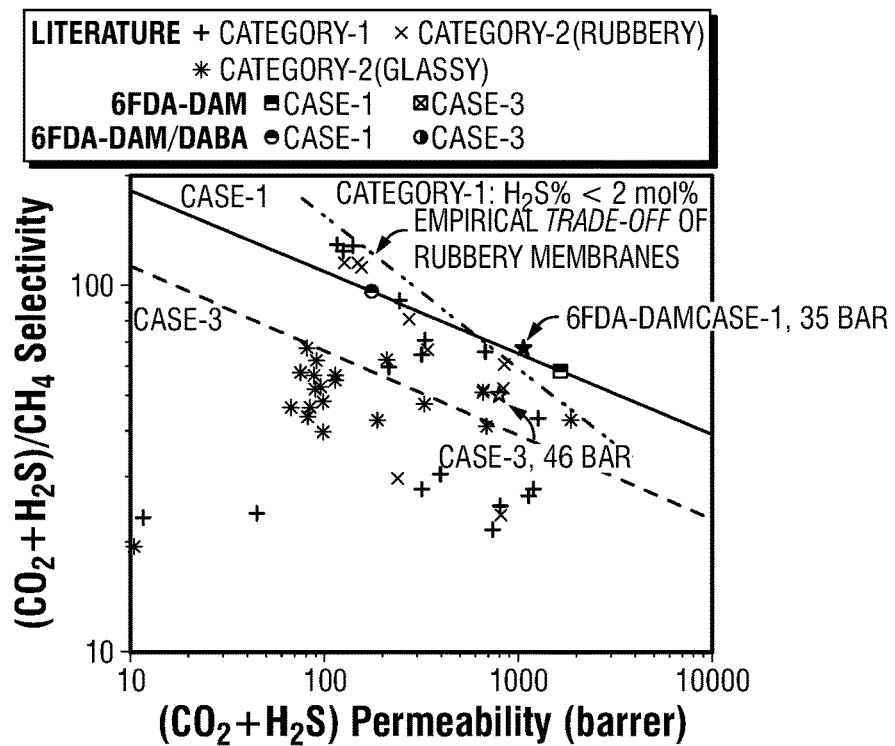
FIG. 10 shows Comparison of (H2S+CO2)/CH4 separation performance between the glassy polymer membranes and the rubbery polymer membranes in (a) Category-1 and (b) Category-2. Category-1 and Category-2 represent the H2S concentration in the ternary mixed gas is <2% and >2% in molar concentration, respectively.
Figure 10B:
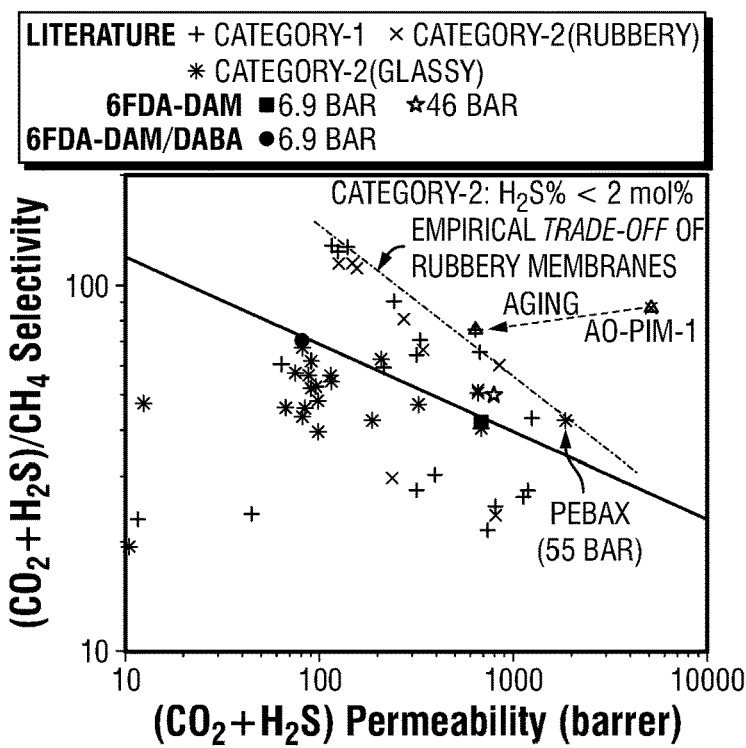

Although the rubbery polymer membranes have been commercialized in $H_2S$ separation due to their excellent $H_2S$ sorption capacity, the current study demonstrates that glassy polyimides can also offer promising $H_2S/CH_4$ separation performance with bonus of well-maintained $CO_2/CH_4$ separation ability. The membrane performance for acid gas removal between rubbery and glassy polymer membranes was compared in terms of $H_2S/CH_4$, $CO_2/CH_4$ and $(H_2S+CO_2)/CH_4$ separation efficiency. Several key factors are considered in the comparison: (1) effect of $H_2S$ concentration; (2) effect of operation temperature; and (3) effect of pressure, to ensure membrane performance are compared under similar conditions. The published data was summarized into two categories: Category-1 and Category-2, representing data obtained from a $H_2S/CO_2/CH_4$ mixture with a $H_2S$ concentration <2 mol. % and >2 mol. %, respectively. Data from different temperatures and different pressures are distinguished. Additionally, data from mixed matrix membranes are not included for comparison as beyond the topic of this study. Detailed literature data in FIG. 8-10 are available in the Supplementary Information.

Figure 8A:
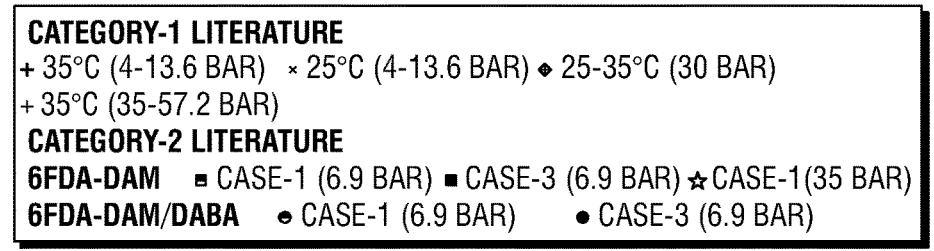
FIG. 8 shows Comparison of H2S/CH4 separation performance between glassy and rubbery polymer membranes in (a) Category-1 and (b) Category-2. Category-1 and Category-2 represent the H2S concentration in the ternary mixed gas are <2 mol. % and >2 mol. % in molar concentration, respectively.
Figure 8A:
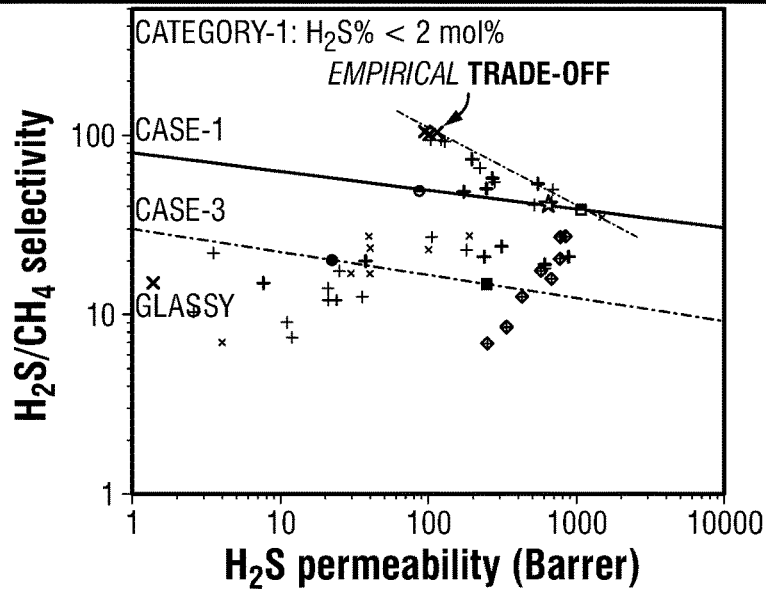

FIG. 8 compares the $H_2S/CH_4$ separation performance of rubbery polymer membranes [17, 28-30] and glassy polyimide membranes in the two categories defined above. Briefly, the results demonstrate that the evaluation of membrane materials regarding $H_2S$ removal from natural gas must be reconsidered since glassy polymers are competitive or better than rubbery polymers in both categories. Specifically, in FIG. 8a, the 6FDA-DAM membrane (Case-1) reported in this study shows comparative performance with the best rubbery polymer membranes in Category-1 under pressures of 7-10 bar. The $H_2S/CH_4$ separation performance of 6FDA-DAM membrane rides on the empirical trade-off relationship of rubbery polymer membranes for $H_2S/CH_4$ separation established in this study. Moreover, the $H_2S/CH_4$ separation efficiency of the 6FDA-DAM membrane has negligible drop when the pressure increases to 35 bar at 35° C., which is much higher than the membrane performance of rubbery PPG-HDI-BDO at 25-35° C. and 30 bar (blue points in FIG. 8a) [31].

FIG. 8. Comparison of $H_2S/CH_4$ separation performance between glassy and rubbery polymer membranes in FIG. 8(a) Category-1 and (b) Category-2. Category-1 and Category-2 represent the $H_2S$ concentration in the ternary mixed gas are <2 mol. % and >2 mol. % in molar concentration, respectively. Literature data obtained from different temperatures and pressures are specified to fully compare membrane performance. Additionally, literature data in Category-1 are mainly obtained from rubbery polymer membranes except 6FDA-mPDA-(6FDA-durene) [32], while literature data in Category-2 under high pressures are mainly from glassy polymer membranes except PEBAX [33] as marked.

Figure 8B:
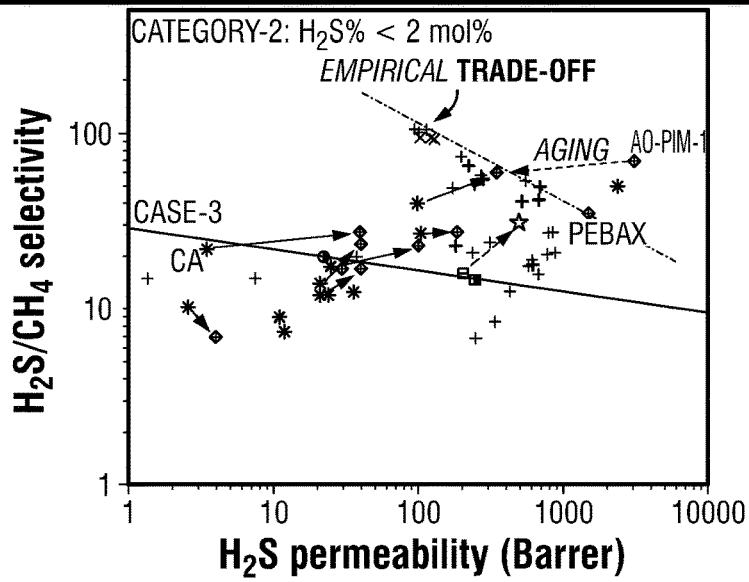

FIG. 8(b) shows the membrane performance comparison in Category-2 with the empirical trade-off relationship of rubbery polymer membrane. The glassy polymer membranes reported in this study exhibit much lower performance in comparison with the rubbery polymer membranes under pressures of 7-10 bar; however, the discrepancy is reduced at higher pressures, e.g. >46 bar. This is mainly because of the plasticization-enhanced $H_2S/CH_4$ separation efficiency of the glassy polyimide membranes as discussed above. On the other hand, the plasticization of rubber polymer membranes may only introduce an increase of $H_2S$ permeability but with a decrease of $H_2S/CH_4$ selectivity [33, 34]. Therefore, the 6FDA-DAM membrane shows close $H_2S/CH_4$ selectivity as the Pebax (SA01MV3000) membrane at 46 bar (31 vs. 35, respectively), as shown in FIG. 8b. Although the $H_2S$ permeability of the 6FDA-DAM membrane is still lower than that of the PEBAX membrane (495 barrer vs. 1500 barrer), this could be easily overcome by fabricating hollow fiber membranes using the 6FDA-DAM polyimide with a skin layer <0.5 μm to provide higher $H_2S$ permeance. Spinning such kind of polyimide-based hollow fiber membranes is ongoing.

Comparing with other glassy polymer membranes, 6FDA-DAM shows several advantages on balancing separation performance and practical factors. Indeed, plasticization also enhances the $H_2S/CH_4$ separation in other glassy polyimide membranes, e.g. cellulose acetate (CA) [35], 6FDA-DAM/DABA (3:2) [12, 16], TEGMC and DEGMC [12] (FIG. 8b); however, 6FDA-DAM is the best among these polyimides. On the other hand, AO-PIM-1 with aimoxime functional group shows exceptional $H_2S/CH_4$ separation performance after plasticization, whereas the polymer exhibits a drastic aging effect (FIG. 7b) [25]. In this regard, the 6FDA-DAM polyimide with less aging properties provides attractive $H_2S/CH_4$ separation performance benefiting from plasticization. Nevertheless, the extraordinary $H_2S/CH_4$ separation performance of AO-PIM-1 membrane suggests a feasible approach to enhance $H_2S/CH_4$ separation performance by grafting functional groups, which will be the focus in our future works.

Temperature effect should be considered for the comparisons, as shown in FIGS. 9a and b. Lowered operation temperatures in permeation measurements (35° C. →20° C.) lead to enhanced $H_2S/CH_4$ selectivity (74 →102) but decreased $H_2S$ permeability (199 barrer→102 barrer) for rubbery polymer membranes, e.g. PU4, in a $H_2S/CO_2/CH_4$ mixture of 1.3/27.9/70.8 under 10 bar [28]. Moreover, the same membrane material may show different $H_2S/CO_2$ separation performance under different gas concentrations. For instance, $H_2S/CH_4$ selectivity decreased (74 →66) with slight increase of $H_2S$ permeability (199 barrer →223 barrer) for PU4 membrane when the gas molar concentration changes from 1.3/27.9/70.8 to 12.5/18.1/69.4 for $H_2S/CO_2/CH_4$, respectively, at 35° C. and 10 bar [28]. Therefore, comparison of membrane materials on $H_2S/CH_4$ separation should be conducted under the same or very close conditions, e.g. gas concentration, temperature and pressure etc.

Besides the $H_2S/CH_4$ separation performance, the $CO_2/CH_4$ separation performance of the glassy polyimide membranes and the rubbery polymer membranes are also compared, as shown in FIG. 9. Obviously, the glassy polyimide membranes show better performance than the rubbery polymer membranes for $CO_2/CH_4$ separation. Although plasticization occurs at 46 bar, the 6FDA-DAM membrane still possesses a reasonably high $CO_2/CH_4$ separation performance in comparison with the rubbery polymer membranes. This can be attributed to the fact that the glassy polyimides still preserve some molecular discriminating effect after plasticization.

FIG. 9. Comparison of $CO_2/CH_4$ separation performance between the glassy polyimide membranes and the rubbery polymer membranes. All data are obtained from $H_2S/CO_2/CH_4$ ternary mixtures.

The acid gas ($H_2S$ and $CO_2$) co-removal efficiency of the glassy polyimide membranes and the rubbery polymer membranes was compared, as shown in FIG. 10. Generally, the 6FDA-based polyimide membranes are among the best polymer membranes reported in both Category 1 and Category 2 due to the high efficiency of the membranes on both $H_2S/CH_4$ and $CO_2/CH_4$ removal. This is especially significant given the ability to facilely spin thin-skinned hollow fiber asymmetric structure from those glassy materials. This agrees well with our expectation that glassy polyimide membrane can simultaneously remove $H_2S$ and $CO_2$ from the natural gas.

FIG. 10. Comparison of $(H_2S+CO_2)/CH_4$ separation performance between the glassy polymer membranes and the rubbery polymer membranes in (a) Category-1 and (b) Category-2. Category-1 and Category-2 represent the $H_2S$ concentration in the ternary mixed gas is <2% and >2% in molar concentration, respectively.

CONCLUSIONS

In conclusion, the 6FDA-based glassy polyimide membranes can provide competitive $H_2S/CH_4$ separation efficiency with rubbery polymer membranes and meanwhile exhibit much higher $CO_2/CH_4$ separation capacity. The $H_2S/CH_4$ separation efficiency of the polyimide membranes relies strongly on the sorption factor, while the $CO_2/CH_4$ separation efficiency is contributed by both sorption factor and diffusion factor. The membrane performance can be affected by measuring temperature, pressure and composition of the ternary gas mixture. Moreover, plasticization of the polyimides is a benefit for $H_2S/CH_4$ separation by promoting the sorption factor, whereas it is a drawback for $CO_2/CH_4$ separation due to the partially loss of the molecular sieving effect. At 35° C. and 46 bar, the 6FDA-DAM membrane shows a promising $H_2S/CH_4$ separation capacity ($H_2S$ permeability of 495 barrer and $H_2S/CH_4$ selectivity of ~31) and a well maintained $CO_2/CH_4$ separation capacity ($CO_2$ permeability of 301 barrer and $CO_2/CH_4$ selectivity of ~19).

Supplementary Information

Figure 11A:
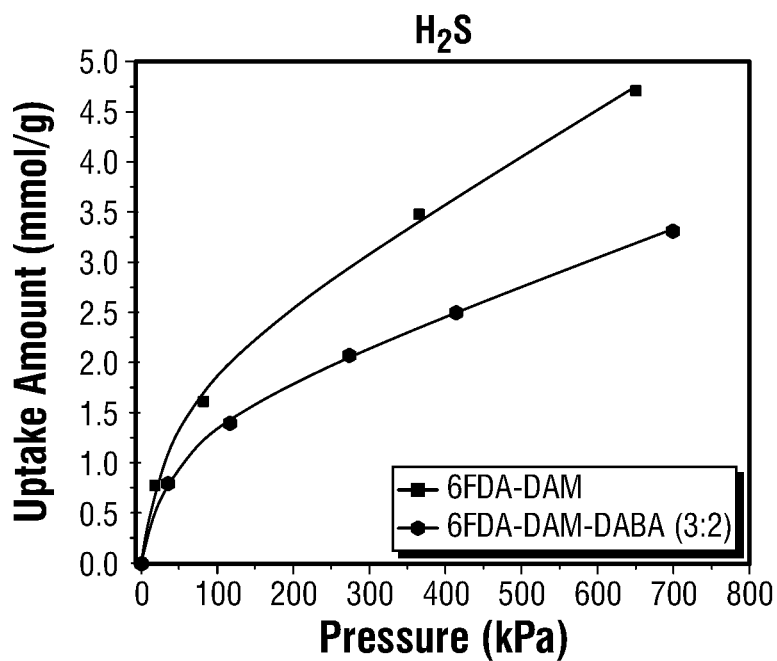
FIG. 11 shows Sorption isotherms of H2S in FIG. 11(a), CO2 in FIG. 11(b) and CH4 in FIG. 11(c) 6FDA-DAM and 6FDA-DAM/DABA (3:2) at 35° C.
Figure 11B:
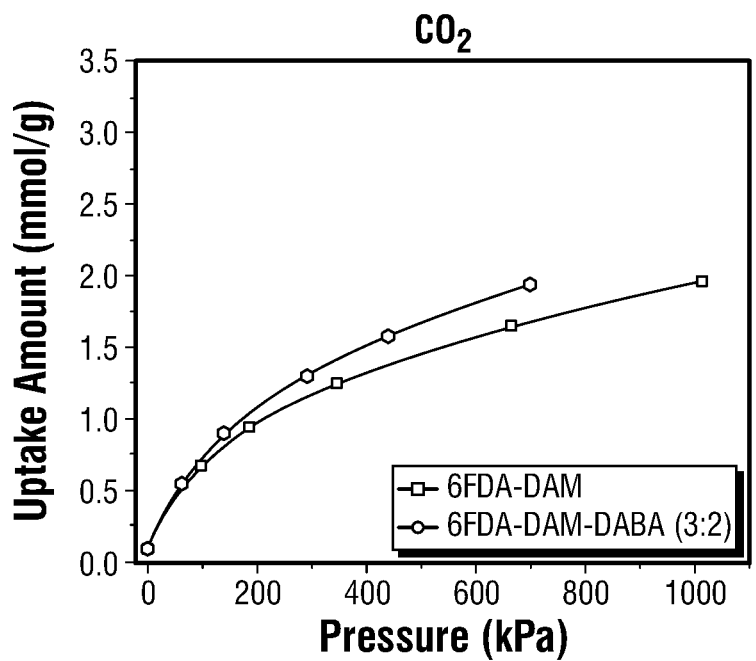
Figure 11C:
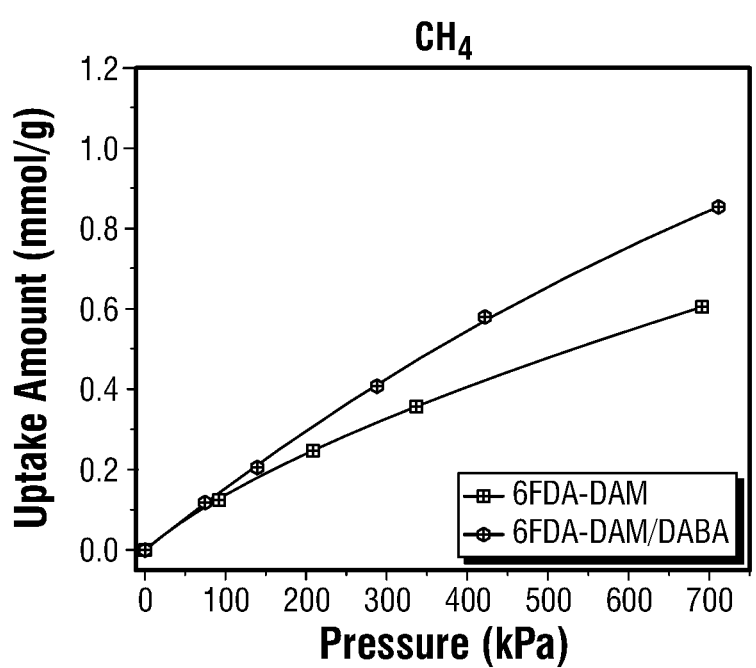

FIG. 11. Sorption isotherms of $H_2S$ in FIG. 11(a), $CO_2$ in FIG. 11(b) and $CH_4$ in FIG. 11(c) 6FDA-DAM and 6FDA-DAM/DABA (3:2) at 35° C. The red lines represent linear fitting by dual mode sorption model with fitting parameters shown in Table S2.

TABLE S1

Physical properties of the primary sour gas components

|  | $CO_2$ | $H_2S$ | $CH_4$ |
|---|---|---|---|
| $d_k$ (Å) | 3.3 | 3.6 | 3.8 |
| $T_c$ (K) | 304.1 | 373.2 | 190.4 |

TABLE S2

Dual mode sorption model parameters for 6FDA-DAM and 6FDA-DAM/DABA (3:2)

|  | 6FDA-DAM | | | 6FDA-DAM/DABA (3:2) | | |
|---|---|---|---|---|---|---|
|  | $H_2S$ | $CO_2$ | $CH_4$ | $H_2S$ | $CO_2$ | $CH_4$ |
| $k_D$ (ccSTP/cc/psig) | 0.613 | 0.211 | 0.062 | 0.595 | 0.146 | 0.060 |
| C'H (ccSTP/cc) | 92.055 | 47.929 | 32.511 | 46.954 | 41.423 | 26.311 |
| b (1/psig) | 0.075 | 0.040 | 0.009 | 0.165 | 0.043 | 0.010 |

TABLE S3

Summary of polymer membrane performance on H2S/CO2/CH4 separation

| Polymers | Gas composition | Temp. (° C.) | Feed (bar) | Permeability | | | Selectivity | | | | Ref. |
|---|---|---|---|---|---|---|---|---|---|---|---|
|  |  |  |  | $H_2S$ | $CO_2$ | $H_2S + CO_2$ | $H_2S/CH_4$ | $CO_2/CH_4$ | $CO_2/H_2S$ | $(H_2S + CO_2)/CH_4$ |  |
| Rubbery, Category-1 (H2S % <2 mol %) | | | | | | | | | | | |
| MX1074 | 1.3/27.9/70.8 | 35 | 10 | 553 | 122 | 675 | 54 | 12 | 0.22 | 66 | [1] |
| MX1657 | 1.3/27.9/70.8 | 35 | 10 | 248 | 69.1 | 317.1 | 51 | 14 | 0.28 | 65 |  |
| MX1041 | 1.3/27.9/70.8 | 35 | 10 | 175 | 39.7 | 214.7 | 49 | 11 | 0.27 | 60 |  |
| 4033 SA00 | 1.3/27.9/70.8 | 35 | 10 | 312 | 84.4 | 396.4 | 24 | 6.5 | 0.27 | 30.5 |  |
| 3533 SA00 | 1.3/27.9/70.8 | 35 | 10 | 888 | 243 | 1131 | 21 | 5.7 | 0.27 | 26.7 |  |
| 6333 SA00 | 1.3/27.9/70.8 | 35 | 10 | 37.8 | 7.4 | 45.2 | 20 | 3.9 | 0.20 | 23.9 |  |
| 7233 SA00 | 1.3/27.9/70.8 | 35 | 10 | 7.6 | 4.1 | 11.7 | 15 | 8.2 | 0.54 | 23.2 |  |
| PU1 | 1.3/27.9/70.8 | 35 | 10 | 239 | 77.5 | 316.5 | 21 | 6.9 | 0.32 | 27.9 |  |
| PU2 | 1.3/27.9/70.8 | 35 | 10 | 613 | 197 | 810 | 19 | 6.1 | 0.32 | 25.1 |  |
| PU3 | 1.3/27.9/70.8 | 35 | 10 | 271 | 58.8 | 329.8 | 58 | 13 | 0.22 | 71 |  |
| PU4 | 1.3/27.9/70.8 | 35 | 10 | 199 | 44.7 | 243.7 | 74 | 17 | 0.22 | 91 |  |
|  | 1.3/27.9/70.8 | 20 | 4 | 95.2 | 21 | 116.2 | 106 | 23 | 0.22 | 129 |  |
|  | 1.3/27.9/70.8 | 20 | 10 | 102 | 22.4 | 124.4 | 102 | 22 | 0.22 | 124 |  |
|  | 1.3/27.9/70.8 | 20 | 13.6 | 115 | 24.8 | 139.8 | 105 | 23 | 0.22 | 128 |  |
| PPG-HDI-BDO | 0.0186 | 25 | 30 | 580 |  |  | 17.6 |  |  |  | [2] |
|  | 0.0186 | 35 | 30 | 780 |  |  | 20.5 |  |  |  |  |
|  | 0.0750 | 25 | 30 | 850 |  |  | 27.4 |  |  |  |  |
|  | 0.4/2.1/97.5 | 25 | 30 | 430 | 306 | 736 | 12.6 | 9.0 | 0.71 | 21.6 |  |
|  | 0.4/2.1/97.5 | 35 | 30 | 680 | 516 | 1196 | 15.8 | 12.0 | 0.76 | 27.8 |  |
|  | 0.66/2.1/97.24 | 25 | 30 | 790 | 473 | 1263 | 27.2 | 16.3 | 0.60 | 43.5 |  |
| Rubbery, Category-2 (H2S % >2 mol %) | | | | | | | | | | | |
| MX1074 | 12.5/18.1/69.4 | 35 | 10 | 695 | 155 | 850 | 50 | 11 | 0.22 | 61 | [1] |
| PU1 | 12.5/18.1/69.4 | 35 | 10 | 183 | 55.8 | 238.8 | 23 | 6.9 | 0.30 | 29.9 |  |
| PU2 | 12.5/18.1/69.4 | 35 | 10 | 618 | 195 | 813 | 18 | 5.6 | 0.32 | 23.6 |  |
| PU3 | 12.5/18.1/69.4 | 35 | 10 | 280 | 62.2 | 342.2 | 55 | 12 | 0.22 | 67 |  |
| PU4 | 12.5/18.1/69.4 | 35 | 10 | 223 | 50.8 | 273.8 | 66 | 15 | 0.23 | 81 |  |
|  | 12.5/18.1/69.4 | 20 | 4 | 104 | 22 | 126 | 95 | 20 | 0.21 | 115 |  |
|  | 12.5/18.1/69.4 | 20 | 10 | 123 | 25.4 | 148.4 | 95 | 20 | 0.21 | 115 |  |
|  | 12.5/18.1/69.4 | 20 | 13.6 | 130 | 26.8 | 156.8 | 93 | 19 | 0.21 | 112 |  |

TABLE S3-continued

Summary of polymer membrane performance on H2S/CO2/CH4 separation

| Polymers | Gas composition | Temp. (° C.) | Feed (bar) | Permeability | | | Selectivity | | | | Ref. |
|---|---|---|---|---|---|---|---|---|---|---|---|
| | | | | $H_2S$ | $CO_2$ | $H_2S + CO_2$ | $H_2S/CH_4$ | $CO_2/CH_4$ | $CO_2/H_2S$ | $(H_2S + CO_2)/CH_4$ | |
| PEBAX (SA01 MV3000) | 5/45/50 | 35 | 13.8 | 520 | 137 | 657 | 41 | 11 | 0.27 | 52 | [3] |
| | 20/20/60 | 35 | 13.8 | 670 | 155 | 825 | 42 | 10 | 0.24 | 52 | |
| | 20/20/60 | 35 | 57.2 | 1500 | 350 | 1850 | 35 | 8 | 0.23 | 43 | |
| PUU* | 3/6/91 | 25 | 5 | 135* | 39* | 174* | 52 | 15 | 0.29 | 67 | [4] |
| | 3/6/91 | 25 | 25 | 118* | 35* | 153* | 24 | 8 | 0.33 | 32 | |
| | 3/6/91 | 35 | 5 | 110* | 32* | 142* | 44 | 14 | 0.32 | 58 | |
| | 3/6/91 | 35 | 25 | 85* | 30* | 115* | 20 | 7 | 0.35 | 27 | |
| Glassy polyimide, Category-1 (1 $H_2S$ % <2 mol %) | | | | | | | | | | | |
| 6FDA-mPDA-(6FDA-durene) | 1/10/59 + N2 bal. | 22 | 34.5 | 1.38 | 1.87 | 3.25 | 15 | 32 | 1.36 | 47 | [5] |
| 6FDA-DAM | 0.5/20/79.5 | 35 | 6.9 | 1076 | 737 | 1813 | 38.6 | 26.6 | 0.69 | 65.2 | this work |
| | 0.5/20/79.5 | 35 | 34.5 | 612 | 411 | 1023 | 38.7 | 26 | 0.67 | 64.7 | this work |
| 6FDA-DAM/DABA_200C | 0.5/20/79.5 | 35 | 6.9 | 87.4 | 91 | 178.4 | 49.1 | 50.6 | 1.03 | 99.7 | this work |
| Glassy polyimide, Category-2 (1 $H_2S$ % >2 mol %) | | | | | | | | | | | |
| CA | 6/29/65 | 35 | 10 | 2.13 | 2.43 | 4.56 | 19 | 22 | 1.14 | 41 | [1] |
| | 20/20/60 | 35 | 6.9 | 4 | 6 | 10 | 22 | 31 | 1.41 | 53 | [6] |
| | 20/20/60 | 35 | 48.3 | 39.7 | 27.5 | 67.2 | 27.4 | 19.1 | 0.70 | 46.5 | |
| GCV-CA | 20/20/60 | 35 | 6.9 | 101.7 | 101 | 202.7 | 27 | 25.5 | 0.94 | 52.5 | [6] |
| | 20/20/60 | 35 | 48.3 | 109 | 110 | 220 | 27.4 | 19.1 | 0.70 | 46.5 | |
| 6F-PAI-1 | 20/20/60 | 35 | 6.9 | 2.8 | 10 | 12.8 | 10.5 | 37.5 | 3.57 | 48 | [3] |
| | 20/20/60 | 35 | 55.2 | 4 | 6.5 | 10.5 | 6.5 | 12.5 | 1.92 | 19 | |
| 6FDA-mPDA-(6FDA-durene) | 10/10/60 + N2 bal. | 22 | 34.5 | 1.1 | 1.5 | 2.6 | 18 | 34 | 1.36 | 52 | [5] |
| | 20/10/60, N2 bal. | 22 | 34.5 | 1.6 | 1.7 | 3.3 | 22.5 | 27.5 | 1.06 | 50 | |
| PIM-6FDA-OH | 15/15/70 | 35 | 6.9 | 24 | 89 | 113 | 12 | 45 | 3.75 | 57 | [7] |
| | 15/15/70 | 35 | 48.3 | 63 | 52.6 | 115.6 | 30 | 25 | 0.83 | 55 | |
| TEGMC | 20/20/60 | 35 | 6.9 | 21 | 67 | 88 | 14 | 43 | 3.07 | 57 | [8] |
| | 20/20/60 | 35 | 48.3 | 40.5 | 50 | 90.5 | 23.5 | 29 | 1.39 | 52.5 | |
| DEGMC | 20/20/60 | 35 | 6.9 | 21 | 75 | 96 | 12 | 41 | 3.42 | 53 | |
| | 20/20/60 | 35 | 55.2 | 38.2 | 54.6 | 92.8 | 19.3 | 28.4 | 1.47 | 47.7 | |
| 6FDA-DAM/DABA_280C | 20/20/60 | 35 | 6.9 | 25 | 66 | 91 | 17.5 | 45 | 2.57 | 62.5 | |
| | 20/20/60 | 35 | 55.2 | 101 | 87 | 188 | 23 | 20 | 0.87 | 43 | |
| 6FDA-DAM/DABA_180C | 10/20/70 | 35 | 6.9 | 11 | 65 | 76 | 9 | 49.5 | 5.5 | 58.5 | [9] |
| | 10/20/70 | 35 | 62 | 25.4 | 55.6 | 81 | 14.7 | 32.1 | 2.18 | 46.8 | |
| 6FDA-DAM/DABA_230C | 10/20/70 | 35 | 6.9 | 12 | 74 | 86 | 8 | 39.5 | 4.94 | 47.5 | |
| | 10/20/70 | 35 | 62 | 23.6 | 50.8 | 74.4 | 14.4 | 31.1 | 2.16 | 45.5 | |
| 6FDA-DAM/DABA_200C | 5/45/50 | 35 | 6.9 | 27.1 | 76.9 | 134 | 18.8 | 53.5 | 2.85 | 72.3 | this work |
| | 20/20/60 | 35 | 6.9 | 22.8 | 58.4 | 81.2 | 19.9 | 50.4 | 2.53 | 70.6 | |
| AO-PIM-1 fresh | 20/20/60 | 35 | 6.9 | 2400 | 750 | 3150 | 50 | 15 | 0.3 | 65 | [10] |
| | 20/20/60 | 35 | 77.4 | 4375 | 766 | 5141 | 75.1 | 14.8 | 0.197 | 89.9 | |
| AO-PIM-1 aged | 20/20/60 | 35 | 6.9 | 100 | 95 | 195 | 40 | 18 | 0.45 | 58 | |
| | 20/20/60 | 35 | 55.2 | 500 | 140 | 640 | 61 | 15 | 0.25 | 76 | |
| 6FDA-DAM | 5/45/50 | 35 | 6.9 | 332 | 582.9 | 914.9 | 14.8 | 25.7 | 1.74 | 40.5 | this work |
| | 20/20/60 | 35 | 6.9 | 246.5 | 435.9 | 682.4 | 15.0 | 26.5 | 1.77 | 41.4 | |
| 6FDA-DAM_aged | 20/20/60 | 35 | 6.9 | 206.9 | 375.2 | 582.2 | 16.6 | 30 | 1.81 | 46.6 | |
| | 20/20/60 | 35 | 46.0 | 495.1 | 301.1 | 796.1 | 31.2 | 19 | 0.61 | 50.2 | |

TABLE S4

$H_2S$ and $CO_2$ permeability for polymeric membranes [11]

| Membrane | Permeability (barrer) $H_2S$ | Permeability (barrer) $CO_2$ | $CO_2/H_2S$ selectivity | Ref. |
|---|---|---|---|---|
| Cellulose acetate | 6.09 | 23.42 | 3.85 | [12] |
| Cellophane | 0.57 | 0.26 | 0.45 | [12] |
| Ethyl cellulose | 320 | 84.21 | 0.26 | [12] |
| MDK composite | 0.1 | 0.027 | 0.27 | [13] |
| Nylon 6 | 0.34 | 0.09 | 0.26 | [12] |
| Poly(bis-(phenoxy)) phosphazene | 12 | 4.8 | 0.40 | [14] |
| Poly(bis-(3,5-di-ter-butylphenoxy)1,2-chloro)0.8phosphazene) | 20 | 27.03 | 1.35 | [14] |
| PDMS | 5100 | 3188 | 0.63 | [15] |
| Polyethylene (low density) | 36 | 12.68 | 0.35 | [16] |
| Polyethylene (high density) | 8.6 | 0.36 | 0.04 | [16] |
| Poly ehyl methacrylate | 3.83 | 5.04 | 1.32 | [17] |
| Poly (ether urethane urea) | 150 | 31.98 | 0.21 | [18] |
| 6FDA-HAB | 1.5 | 6 | 4 | [19] |
| PTBP | 16 | 17.02 | 1.06 | [14] |
| Poly phosphazene 6% MEE | 38 | 9.5 | 0.25 | [20] |
| Poly phosphazene 48% MEE | 1003 | 115.29 | 0.11 | [20] |
| Poly phosphazene 74% MEE | 1140 | 228 | 0.2 | [20] |
| Poly propylene | 3.2 | 9.14 | 2.86 | [16] |
| PTMSP | 21400 | 17833 | 0.83 | [21] |
| Poly vinyl alcohol | 0.007 | 0.0125 | 1.79 | [15] |
| Poly vinyl chloride | 0.19 | 0.16 | 0.83 | [16] |
| Poly (vinylidene chloride) Saran | 0.036 | 0.029 | 0.81 | [12] |

Summary of Work and Additional Embodiments

Surprising Plasticization Benefits in Natural Gas Upgrading Using Polyimide Membranes.

Plasticization effects are traditionally viewed as negative features for glassy polyimide membranes. However, plasticization actually is a powerful tool for performance optimization in natural gas upgrading. Specifically plasticization of 6FDA-DAM membrane provides huge benefits for $H_2S/CH_4$ separation, in which both the $H_2S$ permeability and $H_2S/CH_4$ selectivity are highly promoted. Moreover, the $CO_2/CH_4$ separation performance of the membrane may be advantageously preserved. Eventually, the 6FDA-DAM membrane exhibit comparable $H_2S/CH_4$ separation performance but much higher $CO_2/CH_4$ separation performance than that of commercial rubbery polymer membranes, demonstrating itself material for simultaneous $H_2S$ and $CO_2$ removal from natural gas.

Specifically, mixed gas tests under a $H_2S/CO_2/CH_4$ ternary mixture with a composition of 20/20/60, respectively, show that both $H_2S$ permeability and $H_2S/CH_4$ selectivity increase with the increase of total feed pressure up to ~28 bar (FIGS. 1A and 1B). Plasticization of the 6FDA-DAM polyimide is observed when the feed pressure is above ~30 bar, which introduces further increase of $H_2S$ permeability but, surprisingly, no drop of $H_2S/CH_4$ selectivity. This is opposite to traditional understanding that plasticization causes a significant reduction of selectivity. As a result, the 6FDA-DAM membrane shows a $H_2S/CH_4$ selectivity of ~31 at 46 bar, which is above that of commercial rubbery membranes (20-30).

Figure 12:
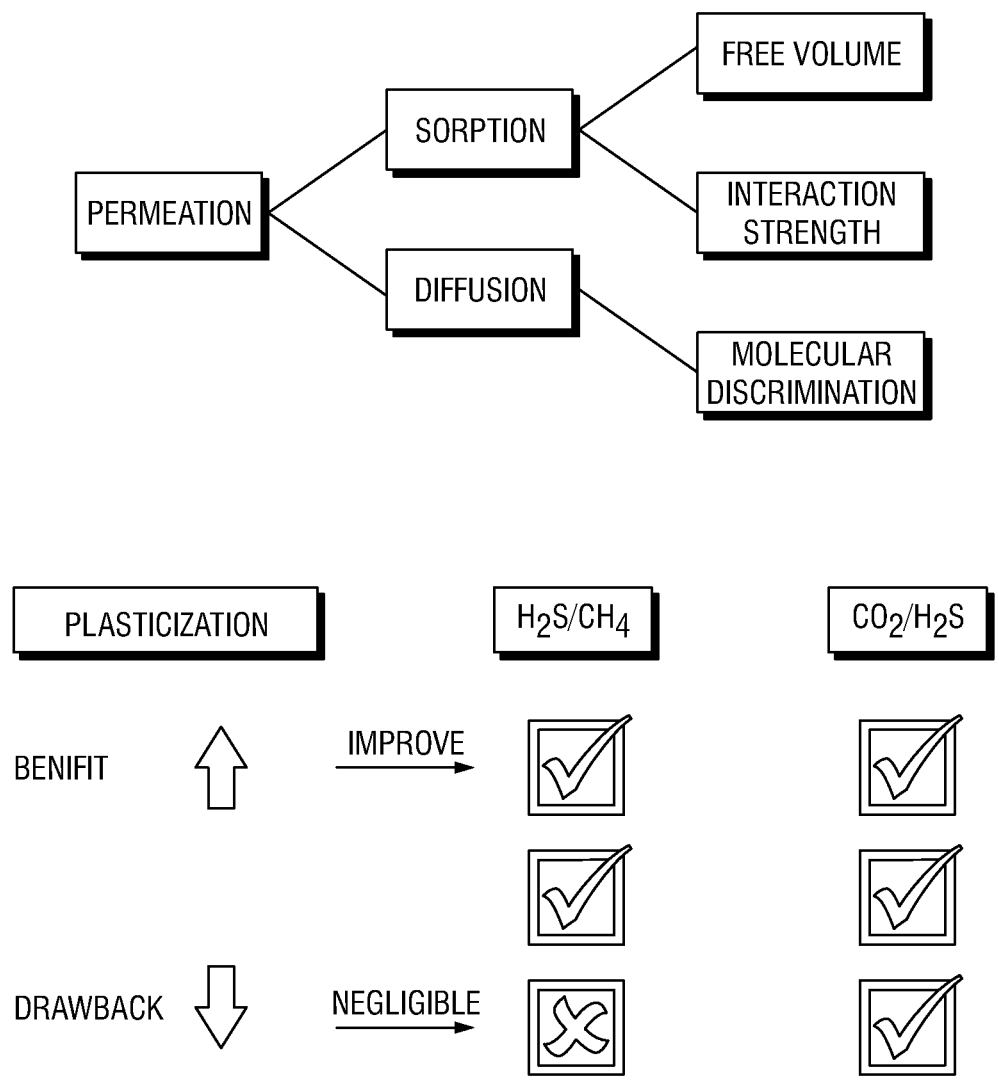
FIG. 12 shows that H2S/CH4 separation may be a sorption-dominated process while CO2/CH4 separation may be controlled by both sorption and diffusion factors.

The pure gas permeability was deconvoluted in terms of solubility and diffusivity contributions based on the sorption-diffusion theory to observe the sorption-selectivity and diffusion-selectivity factors (FIGS. 6A, 6B, and 12). Specifically, the $H_2S/CH_4$ perm-selectivities of the 6FDA-DAM membrane rely on the sorption-selectivity effects while suffering negative contributions from the diffusion-selectivity (<1). Apparently, the polyimide suffers expected diffusion selectivity loss, despite the slightly smaller kinetic diameter of $H_2S$ (3.6 Å) vs. $CH_4$ (3.8 Å). While not wishing to be bound to any theory it may be that stronger sorption attractions between $H_2S$ vs. $CH_4$ with the polymer segments must be overcome to execute a jump, thereby reducing diffusion jump ease for $H_2S$. In this context, in a mixture, $H_2S$ can outcompete $CH_4$ for glassy sorption sites. Despite this advantage, $H_2S$ pays a price for its higher affinity in terms of higher activation energy and hence lower diffusion coefficient than might be expected based on size alone.

On the other hand, both sorption-selectivity and diffusion-selectivity factors promote the $CO_2/CH_4$ perm-selectivity due to higher condensability and smaller molecular size of $CO_2$ vs. $CH_4$, since $CO_2$ has a weaker affinity (FIGS. 6A, 6B, and 12) and more compact size vs. $H_2S$. Simply put, $CH_4$ molecules are beaten by both $H_2S$ molecules and $CO_2$ molecules during mixture permeation. Specifically, $CO_2$ diffuses faster than $H_2S$, whereas $H_2S$ sorbs stronger than $CO_2$ in the polyimide. This complex effect involving $CO_2$ and $H_2S$ makes ternary permeation a fascinating competition process and calls into questions simple tradeoff relations that are convenient for binary feeds.

In this regard, the plasticization of polyimides, e.g. 6FDA-DAM, is no longer a drawback for the $H_2S/CH_4$ separation but only limited for the $CO_2/CH_4$ separation. Indeed, the plasticization of the 6FDA-DAM membrane causes a loss of the efficiency of the molecular sieving effect, which subsequently decreases the $CO_2/CH_4$ selectivity relying strongly on the diffusion-selectivity (FIGS. 1a and 1B). However, the $H_2S/CH_4$ selectivity is dominated by the sorption factor, therefore the lost efficiency of the molecular sieving effect has a negligible effect on further declining the $H_2S/CH_4$ diffusion selectivity, which is already <1 before plasticization. In contrast, the plasticization creates new free volume in the polyimide available for gas molecules to occupy, while $H_2S$ molecules are obviously more sorption-competitive than $CO_2$ and $CH_4$ molecules in such a process. Therefore, a higher free volume and stronger $H_2S$ sorption favorability of a polymer membrane material is often preferable for a $H_2S$-related separation process.

Highly Stable TEGMC Hollow Fiber Membranes for Natural as Sweetening

TEGMC hollow fiber membranes with anti-plasticization features were studied using an aggressive gas composition of high $H_2S$ (20 mol. %), low $CO_2$ (5 mol. %), and significant amounts of $C_2H_6$ (3 mol. %) and $C_3H_8$ (3 mol. %) as well as trace amount of toluene (100-300 ppm) with $CH_4$ comprising the rest of the feed. Various temperatures (35° C. and 50° C.) and pressures (6.9-31.3 bar) are also considered. Remarkably, no obvious plasticization effect was observed for the TEGMC hollow fiber membranes under all measuring conditions, demonstrating the promising stability of the TEGMC membranes.

Figure 13:
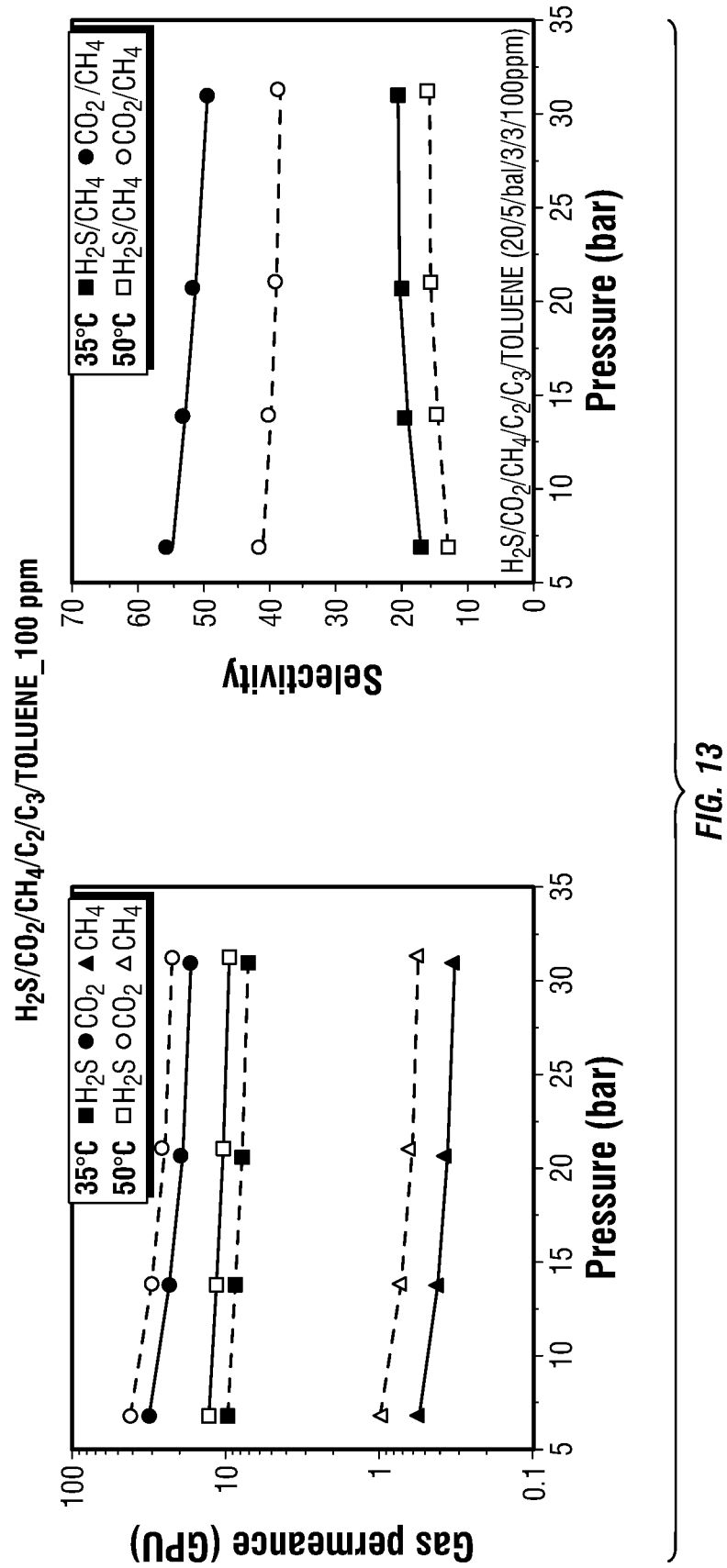
FIG. 13 shows TEGMC membrane results with 100 ppm toluene.
Figure 14:
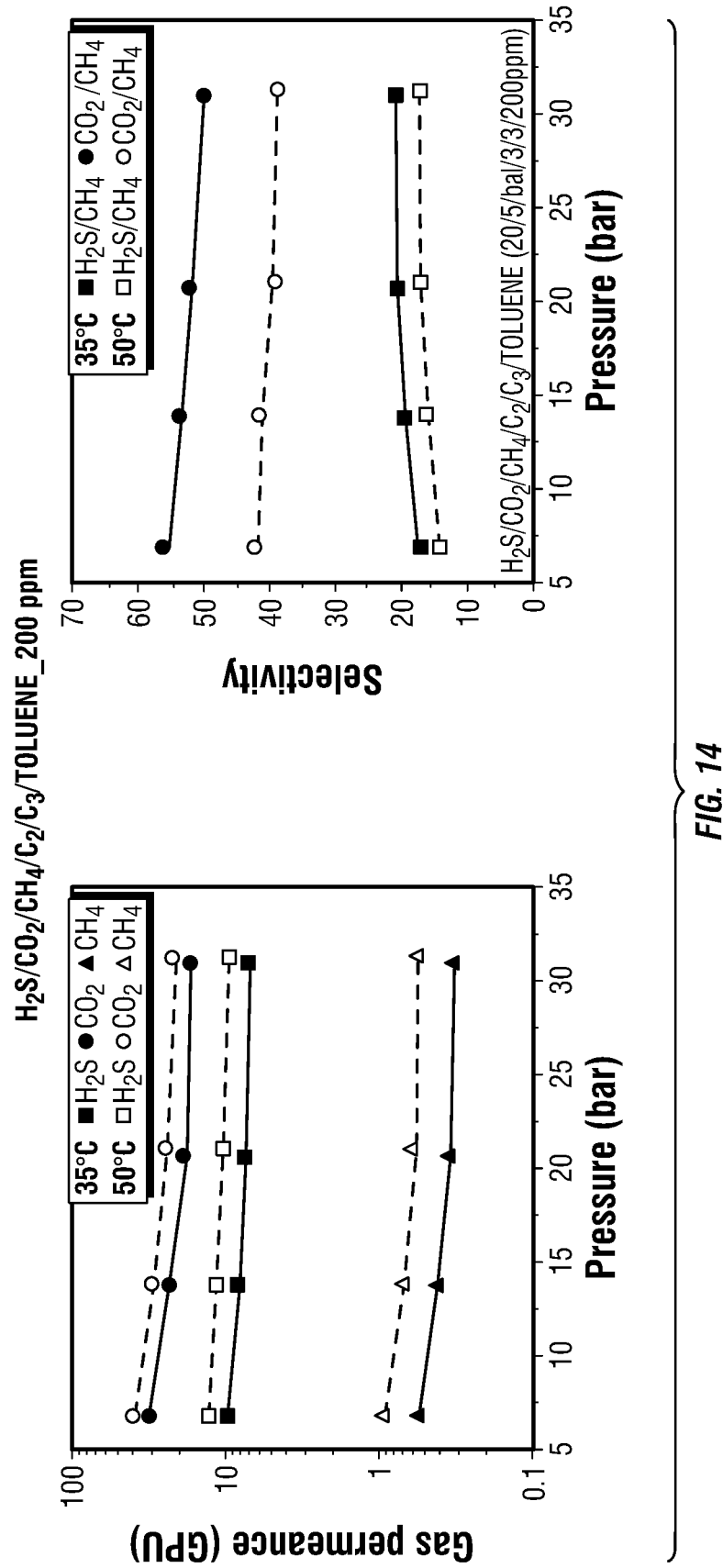
FIG. 14 shows TEGMC membrane results with 200 ppm toluene.
Figure 15:
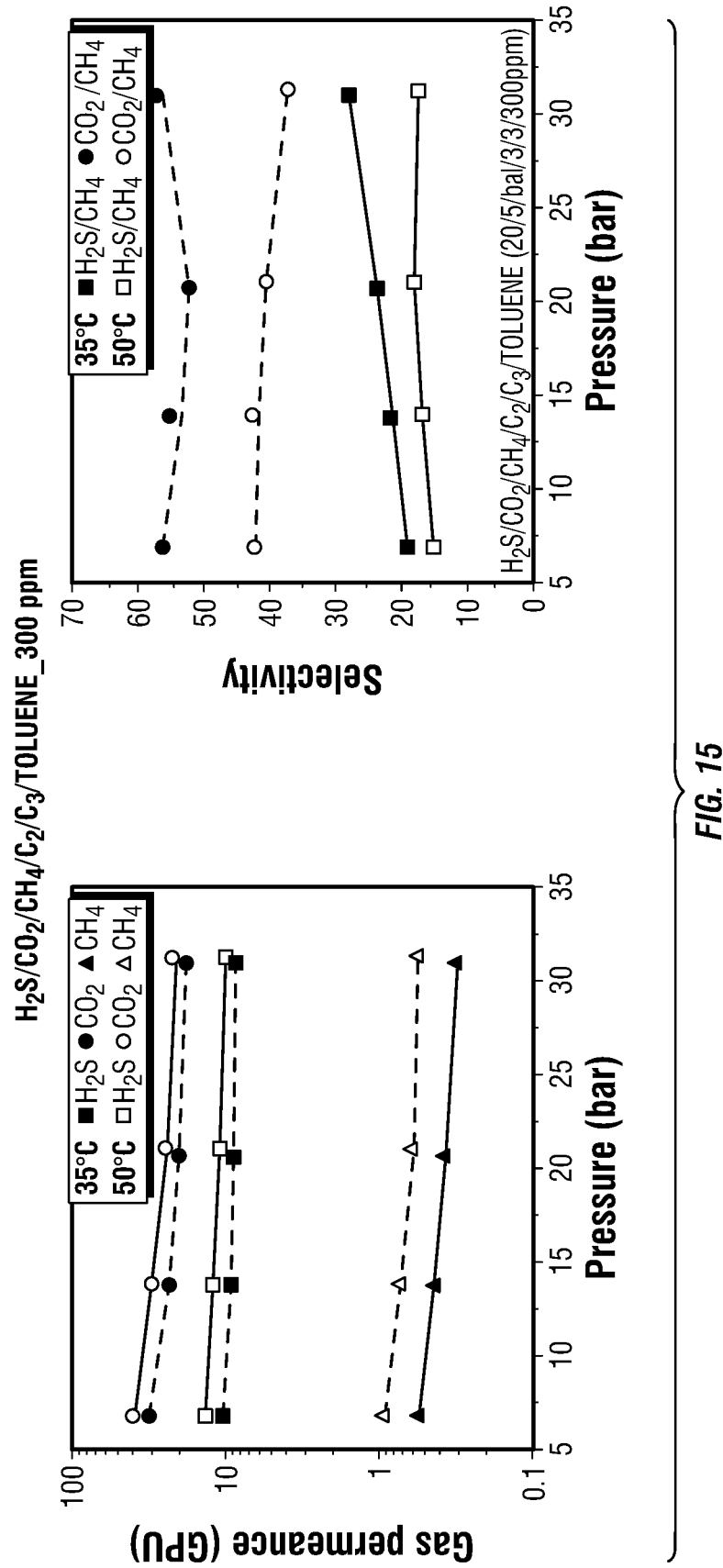
FIG. 15 shows TEGMC membrane results with 300 ppm toluene.

Specifically, $H_2S$, $CO_2$ and $CH_4$ permeance decrease with the increase of measuring pressure regardless of the variation of the toluene concentration and temperature (FIGS. 13-15). On the other hand, $H_2S/CH_4$ selectivity gradually increases with the increase of the measuring pressure, while $CO_2/CH_4$ selectivity shows a slight decrease. This can be attributed to the permeation-competition among $H_2S$, $CO_2$ and $CH_4$ as revealed above. Furthermore, temperature exhibits a significant effect on membrane performance.

Increasing the measuring temperature introduces increased permeance of $H_2S$, $CO_2$ and $CH_4$ but decreased selectivities for $H_2S/CH_4$ and $CO_2/CH_4$ separations. Overall, the TEGMC hollow fiber membranes show excellent performance in ternary main components ($H_2S/CO_2/CH_4$) in the presence of diverse hydrocarbon contaminants. TEGMC hollow fiber membranes may offer more advantages for the $H_2S/CO_2/CH_4$ separation if (1) the skin layer thickness can be further reduced; and (2) controlled-plasticization benefits could be imported by material design.

FIG. 12 shows that $H_2S/CH_4$ separation may be a sorption-dominated process while CO2/CH4 separation may be controlled by both sorption and diffusion factors.

FIG. 13 shows TEGMC results at 100 ppm toluene. No plasticization was observed. H2S permeability decrease, while H2S/CH4 selectivity increase with the pressure increase. TEGMC shows more advantages on CO2 separation over H2S separation; however, this is tunable based on the polyimide fundamentals.

FIG. 14 shows TEGMC results at 200 ppm toluene. No plasticization was observed. H2S permeability decrease, while H2S/CH4 selectivity increase with the pressure increase. Increased toluene concentration has little effect on membrane performance.

FIG. 15 shows TEGMC results at 300 ppm toluene. No plasticization was observed. H2S permeability decrease, while H2S/CH4 selectivity increase with the pressure increase. Increased toluene concentration slightly increased the H2S/CH4 selectivity. Membrane performance is acceptable under high contaminants.

1. A method for removal of hydrogen sulfide from natural gas, comprising: passing a natural gas feed comprising methane and hydrogen sulfide ($H_2S$) through a membrane at normal operating conditions wherein the membrane is an asymmetric hollow fiber membrane or an asymmetric film composite membrane comprising a porous layer and a nonporous skin layer;
wherein the asymmetric hollow fiber membrane or the nonporous skin layer of the asymmetric film composite membrane has plasticized during the method by exposure to condensable gases with high critical temperature under the operating conditions; and
wherein the membrane preferentially removes H2S over methane from the natural gas feed at a H2S/methane selectivity of from 7, or from 9, or from 11, or from 13, or from 15, or from 19, up to 40, or up to 37, or up to 35, or up to 33, or up to 31, or up to 29, or up to 27, or up to 25 when measured at 35° C. and 45 bar.

2. The method of embodiment 1 wherein the condensable gases with high critical temperature are selected from comprise carbon dioxide ($CO_2$), $H_2S$ and combinations thereof 3. The method of embodiment 1 wherein the membrane comprises a hydrophilic polyimide polymer.

4. The method of embodiment 1 wherein the membrane comprises a cellulose acetate polymer.

5. The method of embodiment 1 wherein the natural gas feed further comprises $CO_2$, $C_2H_6$, $C_3H_8$, toluene, mercaptans and combinations thereof 6. The method of embodiment 3 wherein the hydrophilic polyimide polymer comprises side functional groups selected from the group consisting of alcohols, amines, carboxylic acids and combinations thereof 7. The method of embodiment 3 wherein the hydrophilic polyimide polymer comprises a backbone of (4,4'-hexafluoroisopropylidene) diphthalic anhydride-(2,4,6-trimethyl-1,3-diaminobenzene) ("6FDA-DAM").

8. The method of embodiment 3 wherein the natural gas feed is saturated with water.

9. The method of embodiment 7 wherein the backbone further comprises 3,5-diaminebenzoic ("DABA") and the ratio of DAM to DABA is from 1:2 to 1:0.6, or from 1:1.8 to 1:0.7, or from 1:1.7 to 1:0.8, or from 1:1.5 to 1:0.9, or from 1:1.3 to 1:1.

10. The method of embodiment 6 wherein the backbone further comprises monoesterification groups selected from the group consisting of dietheylene glycol ("DEG"), triethylene glycol ("TEG") and tetraethylene glycol ("TetraEG").

11. The method of embodiment 1 wherein the normal operating conditions include a temperature of from 27° C., or from 30° C., or from 35° C., or from 40° C., or from 45° C., or from 50° C. up to 90° C., or up to 85° C., or up to 80° C., or up to 75° C., or up to 70° C., or up to 65° C., or up to 55° C.

12. The method of embodiment 1 wherein the normal operating conditions include a pressure of from 20 bar, or from 25 bar, or from 30 bar, or from 35 bar, or from 40 bar, or from 45 bar up to 80 bar, or up to 75 bar, or up to 70 bar, or up to 65 bar, or up to 60 bar, or up to 55 bar, or up to 50 bar.

13. The method of embodiment 1 wherein the $H_2S$ has a partial pressure of $H_2S$ in the natural gas feed of from 0.23 bar, or from 0.5 bar, or from 0.75 bar, or from 1.0 bar, or from 1.5 bar, or from 2.0 bar, or from 3.0 bar, or from 4.0 bar up to 15 bar, or up to 12 bar, or up to 10 bar, or up to 8 bar, or up to 7 bar, or up to 6 bar.

14. The method of embodiment 1 wherein the natural gas feed further comprises $CO_2$ at a partial pressure of $CO_2$ of from 1.4 bar, or from 2.0 bar, or from 3 bar, or from 4 bar, or from 5 bar, or from 6 bar, or from 7 bar up to 20 bar, or up to 16 bar, or up to 12 bar, or up to 10 bar, or up to 8 bar.

15. A membrane for receiving a natural gas feed comprising methane and hydrogen sulfide ($H_2S$), wherein the membrane is a plasticized asymmetric hollow fiber membrane or an asymmetric film composite membrane comprising a porous layer and a plasticized nonporous skin layer; wherein the membrane preferentially removes $H_2S$ over methane from the natural gas feed at a $H_2S$/methane selectivity of from 7, or from 9, or from 11, or from 13, or from 15, or from 19, up to 40, or up to 37, or up to 35, or up to 33, or up to 31, or up to 29, or up to 27, or up to 25 when measured at 35° C. and 45 bar.

As described above, the instant application pertains to membranes and processes for removal of hydrogen sulfide from natural gas. Advantageously, it has been discovered that a plasticized membrane may enhance performance in, for example, natural gas upgrading. More specifically, the H2S permeability and/or H2S/CH4 selectivity may be increased using a membrane wherein at least a portion up to all of the membrane has been at least partially plasticized. As described above, a membrane may be considered plasticized when the CO2/methane selectivity of a sample of the membrane as determined at 35° C. and 45 bar is at least 33% lower than the CO2/methane selectivity of a separate sample of the membrane as determined at 35° C. and 7 bar. In some embodiments, if the CO2/methane selectivity of a separate sample of the membrane cannot be determined, then an equivalent membrane may be substituted for the separate sample in determining whether to be considered plasticized.

The amount and manner of plasticization may vary depending upon the type of membrane, the specific gases to be employed, and the desired results. Typically, the membrane is a membrane comprising a plasticized component. The plasticized component may comprise (1) plasticized asymmetric hollow fibers in the case of an asymmetric hollow fiber membrane or (2) a nonporous plasticized skin layer in the case of, for example, an asymmetric film composite membrane comprising a porous layer and a nonporous skin layer.

The manner of plasticization is not particularly critical and any method may be employed. For example, plasticization may be induced by temperature—for example, gas solubility in polymers may increase at lower temperature. This may lead to more plasticization in some embodiments. In one embodiment, the asymmetric hollow fiber membrane or the nonporous skin layer of the asymmetric film composite membrane may be plasticized by exposure to condensable gases with high critical temperature. The plasticization may be accomplished while manufacturing the membrane or alternatively may be accomplished while the membrane is being employed to remove $H_2S$ from a natural gas feed comprising methane and $H_2S$ under normal or other operating conditions.

In some embodiments, the plasticized membranes described herein increase H2S permeability compared to an equivalent, unplasticized membrane. In some embodiments, the plasticized membranes described herein increase H2S/CH4 selectivity compared to an equivalent, unplasticized membrane. The degree of increased H2S/CH4 selectivity for the plasticized membrane vs. equivalent, unplasticized membrane varies depending upon a number of factors such as type of membrane, gas mixture, and operating conditions. However, generally the amount of increase in H2S/CH4 selectivity for plasticized membrane may be at least about 2%, or at least about 4%, or at least about 6%, or at least about 8%, or at least about 10%, or at least about 20%, or at least about 30%, or at least about 40%, or at least about 50%, or at least about 60%, up to about 70% or more. For example, as shown in FIG. 1B the observed H2S selectivity increased from about 18 to about 30 (approximately 67% increase) as the H2S partial pressure was increased which induced additional plasticization. Additional information may be found at, for example, "Surprising plasticization benefits in natural gas upgrading using polyimide membranes" by Liu et al., *Journal of Membrane Science, Volume 593*, 1 Jan. 2020, 117430 which article is incorporated herein by reference.

As used herein, the term "hydrophilic polyimide polymer" means a polyimide (polymer comprising an imide monomer) that is more soluble in ethanol-containing spinning dopes than a hydrophobic polyimide, MATRIMID®5218, which is soluble in ternary solutions containing only 18% ethanol.

The chemical structure of MATRIMID is below.

Figure 16:
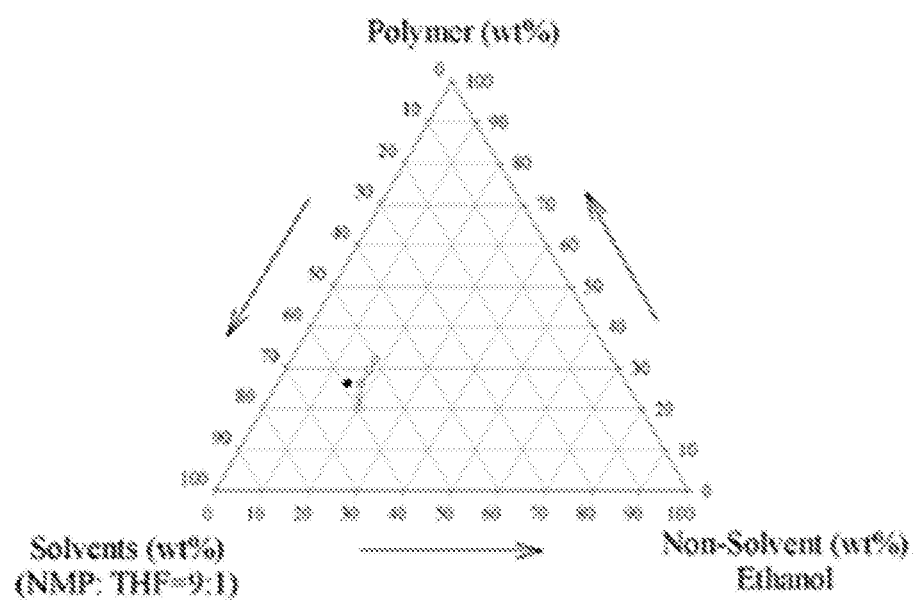
FIG. 16 is a ternary phase diagram for MATRIMID in solvent (N-methyl-2-Pyrrolidone/NMP and Tetrahydrofuran/THF) and non-solvent (ethanol).
Figure 17:
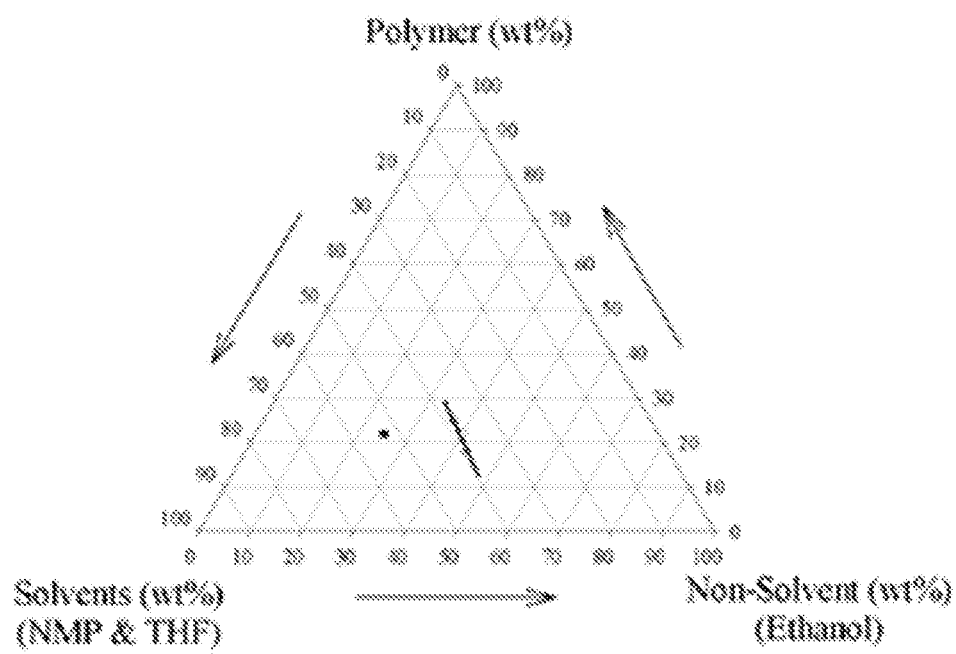
FIG. 17 is a ternary phase diagram for 6FA-DAM in solvent (N-methyl-2-Pyrrolidone/NMP and Tetrahydrofuran/THF) and non-solvent (ethanol).
Figure 18:
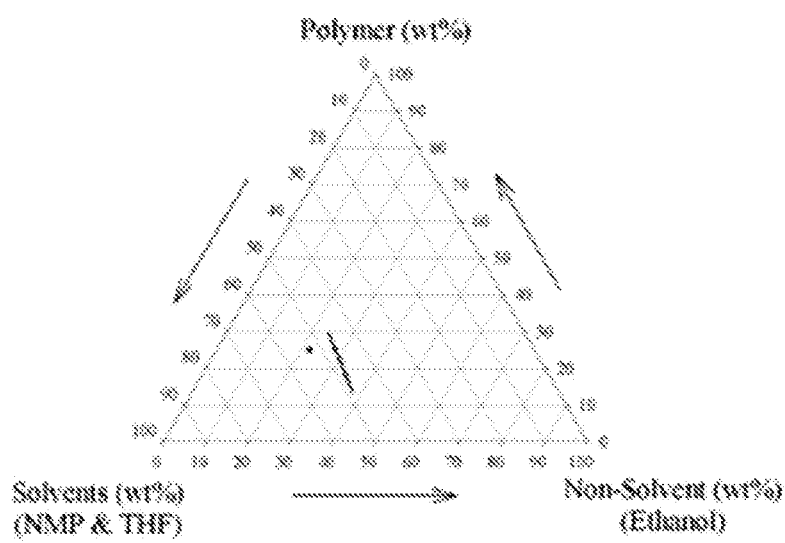
FIG. 18 is a ternary phase diagram for 6FDA:BPDA-DAM in solvent (N-methyl-2-Pyrrolidone/NMP and Tetrahydrofuran/THF) and non-solvent (ethanol).

FIG. 16 is a ternary phase diagram for MATRIMID in solvent (N-methyl-2-Pyrrolidone/NMP and Tetrahydrofuran/THF) and non-solvent (ethanol). FIG. 17 is a ternary phase diagram for 6FA-DAM in solvent (N-methyl-2-Pyrrolidone/NMP and Tetrahydrofuran/THF) and non-solvent (ethanol). FIG. 18 is a ternary phase diagram for 6FDA:BPDA-DAM in solvent (N-methyl-2-Pyrrolidone/NMP and Tetrahydrofuran/THF) and non-solvent (ethanol). In FIGS. 16-18 the open circle indicates compositions on the phase boundary while the solid circle indicates spinning dope composition.

REFERENCES

[1] R. W. Baker, K. Lokhandwala, Natural Gas Processing with Membranes: An Overview, Industrial & Engineering Chemistry Research, 47 (2008) 2109-2121.

[2] M. S. Shah, M. Tsapatsis, J. I. Siepmann, Hydrogen Sulfide Capture: From Absorption in Polar Liquids to Oxide, Zeolite, and Metal-Organic Framework Adsorbents and Membranes, Chemical Reviews, 117 (2017) 9755-9803.

[3] M. Hedayat, M. Soltanieh, S. A. Mousavi, Simultaneous separation of H2S and CO2 from natural gas by hollow fiber membrane contactor using mixture of alkanolamines, Journal of Membrane Science, 377 (2011) 191-197.

[4] C. A. Scholes, G. Dong, J. S. Kim, H. J. Jo, J. Lee, Y. M. Lee, Permeation and separation of SO2, H2S and CO2 through thermally rearranged (TR) polymeric membranes, Separation and Purification Technology, 179 (2017) 449-454.

[5] M. Rezakazemi, I. Heydari, Z. Zhang, Hybrid systems: Combining membrane and absorption technologies leads to more efficient acid gases (CO2 and H2S) removal from natural gas, Journal of Co2 Utilization, 18 (2017) 362-369.

[6] G. George, N. Bhoria, S. AlHallaq, A. Abdala, V. Mittal, Polymer membranes for acid gas removal from natural gas, Separation and Purification Technology, 158 (2016) 333-356.

[7] G. Liu, A. Cadiau, Y. Liu, K. Adil, V. Chernikova, I.-D. Carja, Y. Belmabkhout, M. Karunakaran, O. Shekhah, C. Zhang, A. K. Itta, S. Yi, M. Eddaoudi, W. J. Koros, Enabling Fluorinated MOF-Based Membranes for Simultaneous Removal of H2S and CO2 from Natural Gas, Angewandte Chemie International Edition, 57 (2018) 14811-14816.

[8] A. A. Alghannam, G. O. Yahaya, A. Hayek, I. Mokhtari, Q. Saleem, D. A. Sewdan, A. A. Bahamdan, High pressure pure- and mixed sour gas transport properties of Cardo-type block co-polyimide membranes, Journal of Membrane Science, 553 (2018) 32-42.

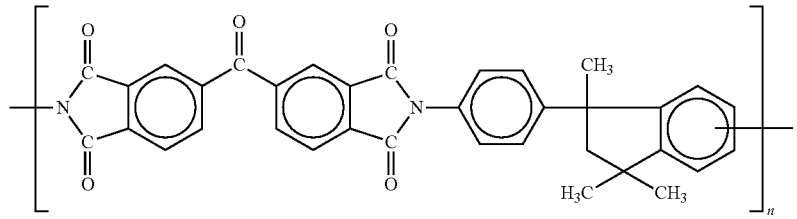

[9] J. Vaughn, W. J. Koros, Effect of the Amide Bond Diamine Structure on the CO2, H2S, and CH4 Transport Properties of a Series of Novel 6FDA-Based Polyamide-Imides for Natural Gas Purification, Macromolecules, 45 (2012) 7036-7049.

[10] S. A. M. Marzouk, M. H. Al-Marzouqi, M. Teramoto, N. Abdullatif, Z. M. Ismail, Simultaneous removal of CO2 and H2S from pressurized CO2-H2S—CH4 gas mixture using hollow fiber membrane contactors, Separation and Purification Technology, 86 (2012) 88-97.

[11] M. Mirfendereski, T. Mohammadi, Investigation of H2S and CO2 Removal from Gas Streams Using Hollow Fiber Membrane Gas-liquid Contactors, Chemical and Biochemical Engineering Quarterly, 31 (2017) 139-144.

[12] B. Kraftschik, W. J. Koros, Cross-Linkable Polyimide Membranes for Improved Plasticization Resistance and Permselectivity in Sour Gas Separations, Macromolecules, 46 (2013) 6908-6921.

[13] V. P. Babu, B. E. Kraftschik, W. J. Koros, Crosslinkable TEGMC asymmetric hollow fiber membranes for aggressive sour gas separations, Journal of Membrane Science, 558 (2018) 94-105.

[14] A. D. Wiheeb, I. K. Shamsudin, M. A. Ahmad, M. N. Murat, J. Kim, M. R. Othman, Present technologies for hydrogen sulfide removal from gaseous mixtures, Reviews in Chemical Engineering, 29 (2013) 449-470.

[15] G. O. Yahaya, I. Mokhtari, A. A. Alghannam, S. H. Choi, H. Maab, A. A. Bahamdan, Cardo-type random co-polyimide membranes for high pressure pure and mixed sour gas feed separations, Journal of Membrane Science, 550 (2018) 526-535.

[16] B. Kraftschik, W. J. Koros, J. R. Johnson, O. Karvan, Dense film polyimide membranes for aggressive sour gas feed separations, Journal of Membrane Science, 428 (2013) 608-619.

[17] R. Quinn, D. Laciak, G. Pez, Polyelectrolyte-salt blend membranes for acid gas separations, Journal of membrane science, 131 (1997) 61-69.

[18] M. Rungta, C. Zhang, W. J. Koros, L. R. Xu, Membrane-based ethylene/ethane separation: The upper bound and beyond, Aiche Journal, 59 (2013) 3475-3489.

[19] R. L. Burns, W. J. Koros, Defining the challenges for $C_3H_6/C_3H_8$ separation using polymeric membranes, Journal of Membrane Science, 211 (2003) 299-309.

[20] L. M. Robeson, The upper bound revisited, Journal of Membrane Science, 320 (2008) 390-400.

[21] B. W. Rowe, L. M. Robeson, B. D. Freeman, D. R. Paul, Influence of temperature on the upper bound: Theoretical considerations and comparison with experimental results, Journal of Membrane Science, 360 (2010) 58-69.

[22] Y. Liu, G. Liu, C. Zhang, W. Qiu, S. Yi, V. Chernikova, Z. Chen, Y. Belmabkhout, O. Shekhah, M. Eddaoudi, W. Koros, Enhanced CO2/CH4 Separation Performance of a Mixed Matrix Membrane Based on Tailored MOF-Polymer Formulations, Advanced Science, 5 (2018) 1800982.

[23] C. Zhang, K. Zhang, L. R. Xu, Y. Labreche, B. Kraftschik, W. J. Koros, Highly scalable ZIF-based mixed-matrix hollow fiber membranes for advanced hydrocarbon separations, Aiche Journal, 60 (2014) 2625-2635.

[24] G. Liu, V. Chernikova, Y. Liu, K. Zhang, Y. Belmabkhout, O. Shekhah, C. Zhang, S. Yi, M. Eddaoudi, W. J. Koros, Mixed matrix formulations with MOF molecular sieving for key energy-intensive separations, Nature materials, (2018) 1.

[25] S. Yi, B. Ghanem, Y. Liu, I. Pinnau, W. J. Koros. Ultrapermeable rigid polymer membranes for energy-efficient hydrogen sulfid separation. Science Advances, 2019, accepted.

[26] W. L. Qiu, L. R. Xu, C. C. Chen, D. R. Paul, W. J. Koros, Gas separation performance of 6FDA-based polyimides with different chemical structures, Polymer, 54 (2013) 6226-6235.

[27] C. Zhang, Y. Dai, J. R. Johnson, O. Karvan, W. J. Koros, High performance ZIF-8/6FDA-DAM mixed matrix membrane for propylene/propane separations, Journal of Membrane Science, 389 (2012) 34-42.

[28] G. Chatterjee, A. Houde, S. Stern, Poly (ether urethane) and poly (ether urethane urea) membranes with high H2S/CH4 selectivity, Journal of Membrane Science, 135 (1997) 99-106.

[29] R. Quinn, D. Laciak, Polyelectrolyte membranes for acid gas separations, Journal of Membrane Science, 131 (1997) 49-60.

[30] S. Stern, B. Bhide, Permeability of silicone polymers to ammonia and hydrogen sulfide, Journal of applied polymer science, 38 (1989) 2131-2147.

[31] M. Sadeghi, M. M. Talakesh, A. A. Shamsabadi, M. Soroush, Novel Application of a Polyurethane Membrane for Efficient Separation of Hydrogen Sulfide from Binary and Ternary Gas Mixtures, Chemistryselect, 3 (2018) 3302-3308.

[32] G. O. Yahaya, M. S. Qahtani, A. Y. Ammar, A. A. Bahamdan, A. W. Ameen, R. H. Alhajry, M. M. B. Sultan, F. Hamad, Aromatic block co-polyimide membranes for sour gas feed separations, Chemical Engineering Journal, 304 (2016) 1020-1030.

[33] J. T. Vaughn, W. J. Koros, Analysis of feed stream acid gas concentration effects on the transport properties and separation performance of polymeric membranes for natural gas sweetening: A comparison between a glassy and rubbery polymer, Journal of Membrane Science, 465 (2014) 107-116.

[34] H. Gholizadeh, A. A. Azar, Removal of hydrogen sulfide from methane using PEO-segmented copolymer-based multilayer composite membrane, Separation Science and Technology, 52 (2017) 2190-2198.

[35] C. S. K. Achoundong, N. Bhuwania, S. K. Burgess, O. Karvan, J. R. Johnson, W. J. Koros, Silane Modification of Cellulose Acetate Dense Films as Materials for Acid Gas Removal, Macromolecules, 46 (2013) 5584-5594.

ADDITIONAL REFERENCES

[1] G. Chatterjee, A. Houde, S. Stern, Poly (ether urethane) and poly (ether urethane urea) membranes with high H2S/CH4 selectivity, Journal of Membrane Science, 135 (1997) 99-106.

[2] M. Sadeghi, M. M. Talakesh, A. A. Shamsabadi, M. Soroush, Novel Application of a Polyurethane Membrane for Efficient Separation of Hydrogen Sulfide from Binary and Ternary Gas Mixtures, Chemistryselect, 3 (2018) 3302-3308.

[3] J. T. Vaughn, W. J. Koros, Analysis of feed stream acid gas concentration effects on the transport properties and separation performance of polymeric membranes for natural gas sweetening: A comparison between a glassy and rubbery polymer, Journal of Membrane Science, 465 (2014) 107-116.

[4] H. Gholizadeh, A. A. Azar, Removal of hydrogen sulfide from methane using PEO-segmented copolymer-based

[5] G. O. Yahaya, M. S. Qahtani, A. Y. Ammar, A. A. Bahamdan, A. W. Ameen, R. H. Alhajry, M. M. B. Sultan, F. Hamad, Aromatic block co-polyimide membranes for sour gas feed separations, Chemical Engineering Journal, 304 (2016) 1020-1030.

[6] C. S. K. Achoundong, N. Bhuwania, S. K. Burgess, O. Karvan, J. R. Johnson, W. J. Koros, Silane Modification of Cellulose Acetate Dense Films as Materials for Acid Gas Removal, Macromolecules, 46 (2013) 5584-5594.

[7] S. L. Yi, X. H. Ma, I. Pinnau, W. J. Koros, A high-performance hydroxyl-functionalized polymer of intrinsic microporosity for an environmentally attractive membrane-based approach to decontamination of sour natural gas, Journal of Materials Chemistry A, 3 (2015) 22794-22806.

[8] B. Kraftschik, W. J. Koros, Cross-Linkable Polyimide Membranes for Improved Plasticization Resistance and Permselectivity in Sour Gas Separations, Macromolecules, 46 (2013) 6908-6921.

[9] B. Kraftschik, W. J. Koros, J. R. Johnson, O. Karvan, Dense film polyimide membranes for aggressive sour gas feed separations, Journal of Membrane Science, 428 (2013) 608-619.

[10] Y. Liu, B. Zhang, D. Liu, P. Sheng, Z. Lai, Fabrication and molecular transport studies of highly c-Oriented AFI membranes, Journal of Membrane Science, 528 (2017) 46-54.

[11] C. A. Scholes, S. E. Kentish, G. W. Stevens, Effects of minor components in carbon dioxide capture using polymeric gas separation membranes, Separation & Purification Reviews, 38 (2009) 1-44.

[12] W. Heilman, V. Tammela, J. Meyer, V. Stannett, M. Szwarc, Permeability of polymer films to hydrogen sulfide gas, Industrial & Engineering Chemistry, 48 (1956) 821-824.

[13] Y. P. Yampol'skii, V. Volkov, Studies in gas permeability and membrane gas separation in the Soviet Union, Journal of membrane science, 64 (1991) 191-228.

[14] C. J. Orme, J. R. Klaehn, F. F. Stewart, Gas permeability and ideal selectivity of poly [bis-(phenoxy) phosphazene], poly [bis-(4-tert-butylphenoxy) phosphazene], and poly [bis-(3,5-di-tert-butylphenoxy) 1.2 (chloro) 0.8 phosphazene], Journal of membrane science, 238 (2004) 47-55.

[15] T. Merkel, R. Gupta, B. Turk, B. Freeman, Mixed-gas permeation of syngas components in poly (dimethylsiloxane) and poly (1-trimethylsilyl-1-propyne) at elevated temperatures, Journal of Membrane Science, 191 (2001) 85-94.

[16] H. Braunisch, H. Lenhart, The permeability of films of synthetic resins and hydrated cellulose for hydrogen sulfide and ammonia, Kolloid Z., 177 (1961) 24.

[17] V. Stannett, J. Williams, The permeability of poly (ethyl methacrylate) to gases and water vapor, in: Journal of Polymer Science Part C: Polymer Symposia, Wiley Online Library, 1965, pp. 45-59.

[18] J. Hao, P. Rice, S. Stern, Upgrading low-quality natural gas with H2S- and CO2-selective polymer membranes: Part I. Process design and economics of membrane stages without recycle streams, Journal of Membrane Science, 209 (2002) 177-206.

[19] M. Harasimowicz, P. Orluk, G. Zakrzewska-Trznadel, A. Chmielewski, Application of polyimide membranes for biogas purification and enrichment, Journal of Hazardous Materials, 144 (2007) 698-702.

[20] C. J. Orme, F. F. Stewart, Mixed gas hydrogen sulfide permeability and separation using supported polyphosphazene membranes, Journal of membrane science, 253 (2005) 243-249.

[21] V. Simril, A. Hershberger, Permeability of polymeric films to gases, Mod. Plast., 27 (1950) 95-101.

What is claimed is:

1. A membrane for removal of hydrogen sulfide from natural gas, comprising
a membrane comprising a plasticized component comprising an uncrosslinked hydrophilic polymer;
wherein the plasticized component comprises (1) plasticized asymmetric hollow fibers or (2) a nonporous plasticized skin layer;
wherein the membrane comprising the plasticized component comprising the uncrosslinked hydrophilic polymer comprises side functional groups selected from the group consisting of alcohols, amines, carboxylic acids and combinations thereof and removes H2S from a natural gas feed comprising methane and H2S at an H2S/methane selectivity of from 7 to 40 when measured at 35° C. and 45 bar and wherein the membrane comprising the plasticized component comprising the uncrosslinked hydrophilic polymer has increased H2S permeability and H2S/CH4 selectivity as compared to the same membrane without the plasticized component.

2. The membrane of claim 1 wherein the membrane comprises the nonporous plasticized skin layer and further comprises a porous layer.

3. The membrane of claim 1 or claim 2 wherein the uncrosslinked hydrophilic polymer comprises a hydrophilic polyimide polymer comprising (4,4'-hexafluoroisopropylidene) diphthalic anhydride-(2,4,6-trimethyl-1,3-diaminobenzene) ("6FDA-DAM").

4. The membrane of claim 3 wherein the hydrophilic polyimide polymer comprises 3,5-diaminebenzoic ("DABA").

5. The membrane of claim 4 wherein a ratio of 6FDA-DAM to DABA is from 1:2 to 1:0.6.

6. A method for removal of hydrogen sulfide from natural gas, comprising:
passing a natural gas feed comprising methane and hydrogen sulfide ($H_2S$) through a membrane under conditions such that the membrane removes $H_2S$ from a natural gas feed comprising methane and $H_2S$ at an $H_2S$/methane selectivity of from 7 to 40 when measured at 35° C. and 45 bar;
wherein the membrane is (1) an asymmetric hollow fiber membrane or (2) an asymmetric film composite membrane comprising a porous layer and a nonporous skin layer; and wherein the method further comprises:
plasticizing at least a portion of the membrane wherein the plasticizing increases $H_2S$ permeability and $H_2S$/$CH_4$ selectivity and wherein the membrane comprises an uncrosslinked hydrophilic polymer.

7. The method of claim 6—wherein the portion to be plasticized comprises hollow fibers or the nonporous skin layer.

8. The method of claim 7 wherein said plasticizing comprises exposing the hollow fibers or the nonporous skin layer to condensable gases under conditions to plasticize.

9. The method of claim 6 wherein the uncrosslinked hydrophilic polymer comprises hydrophilic polyimide polymer.

10. The method of claim 9 wherein the hydrophilic polyimide polymer comprises side functional groups selected from the group consisting of alcohols, amines, carboxylic acids and combinations thereof.

11. The method of claim 9 wherein the hydrophilic polyimide polymer comprises (4,4'-hexafluoroisopropylidene) diphthalic anhydride-(2,4,6-trimethyl-1,3-diaminobenzene) ("6FDA-DAM").

12. The method of claim 9 wherein the hydrophilic polyimide polymer comprises 3,5-diaminebenzoic ("DABA").

13. The method of claim 9 wherein the hydrophilic polyimide polymer comprises (4,4'-hexafluoroisopropylidene) diphthalic anhydride-(2,4,6-trimethyl-1,3-diaminobenzene) ("6FDA-DAM") and 3,5-diaminebenzoic ("DABA") and the ratio of DAM to DABA is from 1:2 to 1:0.6.

14. The method of claim 9 wherein the hydrophilic polyimide polymer comprises monoesterification groups selected from the group consisting of dietheylene glycol ("DEG"), triethylene glycol ("TEG"), tetraethylene glycol ("TetraEG"), and combinations thereof.

15. The method of claim 6 wherein the natural gas feed further comprises CO2, or C2H6, or C3H8, or toluene, or a mercaptan, or water, or a combination thereof.

16. The method of claim 15 wherein the natural gas feed is saturated with water.

17. The method of claim 6 wherein the conditions comprise a temperature of from 27° C. to 90° C.

18. The method of claim 6 wherein the conditions comprise a pressure of from 20 bar to 80 bar.

19. The method of claim 6 wherein the $H_2S$ has a partial pressure of $H_2S$ in the natural gas feed of from 0.23 bar to 15 bar and wherein the natural gas feed further comprises $CO_2$ at a partial pressure of $CO_2$ of from 1.4 bar to 20 bar.

* * * * *